United States Patent
Lutzow et al.

(10) Patent No.: US 11,613,393 B2
(45) Date of Patent: *Mar. 28, 2023

(54) WATER SOFTENER BRINE TANK SALT BAG SPLITTER

(71) Applicants: Garrett Lutzow, Pewaukee, WI (US); Jacob Lutzow, New Berlin, WI (US)

(72) Inventors: Garrett Lutzow, Pewaukee, WI (US); Jacob Lutzow, New Berlin, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/357,793

(22) Filed: Jun. 24, 2021

(65) Prior Publication Data
US 2021/0316893 A1     Oct. 14, 2021

Related U.S. Application Data

(63) Continuation-in-part of application No. 16/408,548, filed on May 10, 2019, now Pat. No. 11,072,449.

(51) Int. Cl.
*B65B 69/00*     (2006.01)
*C02F 5/00*     (2023.01)

(52) U.S. Cl.
CPC ...... *B65B 69/0041* (2013.01); *B65B 69/0008* (2013.01); *B65B 69/0091* (2013.01); *C02F 5/00* (2013.01)

(58) Field of Classification Search
CPC ............ B65B 60/0091; B65B 69/0008; B65B 69/0033; B65B 69/0041; B65B 69/0091
See application file for complete search history.

(56) References Cited

U.S. PATENT DOCUMENTS

| 1,788,267 | A | | 1/1931 | Amaral |
| 2,094,818 | A | | 10/1937 | Rich |
| 3,610,427 | A | * | 10/1971 | Maziarka ............. B65D 85/185 206/290 |
| 3,724,721 | A | | 4/1973 | Barr |
| 3,745,596 | A | * | 7/1973 | Copeland ............... A47C 17/86 5/308 |

(Continued)

FOREIGN PATENT DOCUMENTS

GB     2246755     2/1992

OTHER PUBLICATIONS

The Boss Snowplow TGS 1100 & TGS 600 Tailgate Spreader Installation & Owner's Manual, Boss Products, Iron Mountain, MI, 2012, pp. 1-31.

*Primary Examiner* — Phong H Nguyen
(74) *Attorney, Agent, or Firm* — Jeffrey S. Sokol

(57) ABSTRACT

The present invention is a water softener brine tank salt bag splitter with a blade and telescoping mounting rod positioned below the tank lid to accommodate a variety of tank sizes and stiffen the lateral flexibility of the tank sidewall. Looped vertical mounting brackets secure over and around the upper edge of the tank sidewall to preserve the seal between the tank sidewall and lid. The mounting rod and brackets form a platform to support the weight of a salt bag when pouring salt pellets into the tank. The configuration of the brackets and the weight of the bag locks the bracket in place to prevent the blade from rotating when the bag drops down onto the blade. The device includes a rod assembly with an adjustable length, a cutting blade attached to a surface of the rod assembly, and brackets connectable to first and second ends of the rod assembly.

17 Claims, 13 Drawing Sheets

(56) References Cited

U.S. PATENT DOCUMENTS

| | | | | |
|---|---|---|---|---|
| 4,396,124 | A | * | 8/1983 | Feder .................. A47B 61/003 |
| | | | | 211/124 |
| 4,557,825 | A | | 12/1985 | Wittes |
| 4,811,853 | A | * | 3/1989 | Mead .................. B65D 85/185 |
| | | | | 211/124 |
| 5,101,977 | A | | 4/1992 | Roman |
| 5,267,823 | A | | 12/1993 | Roman |
| 5,405,053 | A | | 4/1995 | Zublin |
| 5,937,766 | A | | 8/1999 | Denny |
| 6,077,021 | A | | 6/2000 | Roman |
| 6,241,097 | B1 | | 6/2001 | Roman |
| 6,568,316 | B1 | * | 5/2003 | Backus ................ A47J 37/041 |
| | | | | 99/421 H |
| 7,073,264 | B2 | | 7/2006 | Votolato |
| 7,559,687 | B2 | | 7/2009 | Swisher |
| 8,864,006 | B1 | | 10/2014 | Page |
| 2005/0040296 | A1 | | 2/2005 | Rosa |
| 2013/0341474 | A1 | | 12/2013 | Baines |
| 2014/0339381 | A1 | | 11/2014 | Weldon |
| 2015/0361775 | A1 | | 12/2015 | Pham |
| 2016/0255981 | A1 | | 9/2016 | Rae |
| 2018/0027764 | A1 | | 2/2018 | Coleman |
| 2019/0154196 | A1 | * | 5/2019 | Lambe .................. G01F 1/662 |

* cited by examiner

WATER SOFTENER BRINE TANK SALT BAG SPLITTER

TECHNICAL FIELD OF THE INVENTION

The present invention pertains to a water softener brine tank salt bag splitter with a blade and telescoping mounting rod positioned below the tank lid to accommodate a variety of tank sizes and stiffen the lateral flexibility of the tank sidewall, and with looped vertical mounting brackets that secure over and around the upper edge of the tank sidewall to preserve the seal between the tank sidewall and lid.

BACKGROUND OF THE INVENTION

Construction and maintenance of residential, commercial, and industrial properties requires many different kinds of materials. Frequently, these materials come in large and/or heavy bags and many bags of the materials are required to complete a specific task. For example, landscapers planting grass for a new lawn or park or fertilizing such an area will generally require many large bags of seed and/or fertilizer. Further, during a snow removal and/or de-icing process, many bags of salt or snow melt may be needed to cover a large area such as, for example, a street or a parking lot. Also, construction workers may need many bags of drywall mud/joint compound, concrete mix, mortar mix, and other materials to complete various projects such as, for example, drywalling a building or installing or fixing a concrete patio, sidewalk, curb, or street. In addition, properties with a water softener may need several bags of salt to fill the water softener's brine tank.

Often, opening bags of materials is simply performed using a hand tool such as, for example, a knife, a snips, or a scissors. Once a bag of materials is cut or split open, the materials usually need to be emptied into a container or machine such as, for example, a water softener brine tank; a five-gallon pail or bucket; a seed, fertilizer, or salt spreader; or a wheel barrow, depending on the type and purpose of the materials. When opening a small number of bags or bags that are relatively light, using a hand tool to open the bag and then emptying the bag's materials into the relevant apparatus may not be too inconvenient. However, when opening a large number of bags or even a small number of large, heavy bags, such as, for example, bags filled with salt, snow melt, seed, or fertilizer, it is cumbersome to repeatedly cut open, lift, and empty the bags.

Some machines include devices that are equipped to split open bags of materials such that the materials are emptied directly into a container on the machine or the machine itself. However, installation and use of those devices are limited to their particular machines. That is, the splitting devices are designed for a singular purpose and cannot be easily modified for use in another machine or by itself. Further, those splitting devices may not be easily removable from their respective machines and may additionally be limited in their use on their corresponding machines. In other words, the device may only be mounted on the machines in one way and cannot be adjusted.

It would therefore be desirable to provide a device that allows bags of materials to be split open in a more convenient and efficient manner and that may be modified for use in a variety of circumstances.

Water softener brine tanks come in a variety of shapes and sizes depending on the amount of water used by the occupants of a residential home or office building. Brine tanks come in variety of shapes, such as cylindrical or square, and have a range of capacities and heights from about three to five and a half (3 to 5.5) feet, and a range of widths or diameters from about eleven to eighteen (11 to 18) inches. The flat bottom of the brine tank rests on the floor and generally defines the lateral perimeter or circumference of the tank. An upwardly extending sidewall extends around the tank perimeter or circumference. The interior of the tank holds salt and water or brine. A lid seals against the sidewalls to close its open upper end. The tank sidewall and lid are commonly made of a flexible, corrosion resistant, non-moister absorbing plastic, such as high or low density polypropylene (HDPE or LDPE). The upper end of the tank sidewall and the downwardly extending rim of the lid are relatively thin, with a thickness of about one-sixteenth to one-eighth ($1/16$ to $1/8$) inch. The thin upper end of the sidewall and rim of the lid are laterally flexible, which allows them to form a snug fit and seal the upper end of the tank. The rim of the lid seals against the tank sidewall to close the upper end and keep the salty vapor and humidity inside the tank from propagating into the air inside a residential home or office building. While brine tanks are designed to hold water and salt inside the tank, they are not particularly suited for supporting heavy objects, such as a salt bag, placed on top of the sidewall when the lid is removed. The sidewall is prone to buckling laterally, which can destabilize its support of a heavy salt bag when the bag is being emptied into the tank. This lack of stability of the upper end of the tank sidewall is particularly pronounced when the tank is running low on salt and for taller tanks. The lack of hoop stress on the upper end of the tank sidewall increases its flexibility and tendency to buckle laterally.

Putting salt into a water softener brine tank is problematic. Water softener salt pellets are sold in conventional plastic bags weighing about twenty-five, forty, fifty or eighty (25, 40, 50 or 80) pounds. The salt pellets flow around inside the bags when the bags are moved, which makes them inherently awkward to handle and difficult to lift. Yet, as the unit cost of the larger bags are less expensive, consumers frequently prefer buying the larger bags at the store, and worry about getting the salt pellets into the brine tank later. At home, the lid sealing the open upper end of the brine tank is temporarily removed. The bag is then lifted three and a half to six feet into the air, over the upper end of the brine tank, and poured into the tank. Lifting a 25 to 80 pound salt bag over three feet into the air, and extending the bag over the brine tank to pore the pellets into the tank is a precarious and potentially dangerous job. When a large slit is cut into the bag before lifting, salt pellets frequently spill all over the floor, making the precarious situation even more dangerous and work intensive. The person can slip on the errant pellets or crush them and create a powder mess on the floor that is difficult to clean up before it is tracked throughout the house. When a small slit is cut into the bag before lifting, the person must hold the 40 or 80 pound bag over the tank for a half minute or more while the pellets slowly pour out of the bag. When the bag is cut open after it is lifted and positioned over the tank sidewall, the person has to maintain the heavy bag in a steady position while handling a sharp cutting tool such as a knife or box cutter. If the bag slips, the person can easily be injured. While the bag empties and its center of gravity shifts, the person can slip. The person also has to readjust the position of the bag to empty it while holding a knife, making this awkward situation even more dangerous.

The present water softener brine tank bag splitter invention is intended to solve these and other problems.

BRIEF DESCRIPTION OF THE INVENTION

Embodiments of the present invention provide a universal bag splitting device that is adaptable to different sizes and configurations such that it may be conveniently installed for use many different settings.

In accordance with one aspect of the invention, a universal bag splitting device includes a rod assembly with an adjustable length, a cutting blade attached to a surface of the rod assembly, and a pair of interchangeable brackets connectable to first and second ends of the rod assembly. The pair of interchangeable brackets are configured to maintain a position of the rod assembly when the universal bag splitting device is in use.

In accordance with another aspect of the invention, a universal bag splitting apparatus includes a rod assembly having a first end, a second end, a support rod, and a first primary extension rod that is adjustable with respect to the support rod at the first end of the rod assembly to modify a length of the rod assembly. The universal bag splitting apparatus also includes a cutting blade attached to the support rod of the rod assembly, a first bracket connectable to at least the first end of the rod assembly, and a second bracket connectable to at least the second end of the rod assembly. The first and second brackets are configured to sustain a position of the rod assembly in at least one configuration selected from the group of a mounted configuration, a supported configuration, and a mounted and supported configuration.

In accordance with yet another aspect of the invention, a kit for a universal bag splitting assembly includes an adjustable rod assembly. The adjustable rod assembly includes a support rod with a first end and a second end. The adjustable rod assembly also includes one or more extension rods positioned at each of the first end of the support rod and the second end of the support rod for adjusting a length of the rod assembly. Each extension rod is moveable with respect to the support rod, another extension rod of the one or more extension rods, or a combination thereof. The universal bag splitting assembly additionally includes a cutting blade attachable to a surface of the support rod between the first and second ends of the support rod and a plurality of interchangeable brackets that are attachable to the rod assembly and capable of sustaining a position of the rod assembly.

An advantage of the present water softener brine tank bag splitter is its versatility. The telescoping rod allows the splitter to fit a variety of brine tanks. The rod can be shortened to fit a small width or diameter tank, or extended to fit a larger width or diameter tank. The telescoping rod allows a single splitter to be used on a wide variety of brine tanks, thus saving manufacturing and marketing costs. Consumers do not need to know the exact size of their brine tank when purchasing the splitter. In addition, should the consumer replace his or her brine tank, the splitter will accommodate the new brine tank even if the size or shape of the tank changes.

Another advantage of the present water softener brine tank bag splitter is its ease of installation. The opposed side brackets of the splitter are easily positioned over the upper edge of the brine tank sidewall, and the telescoping rod is easily extended to fit the width or diameter of the tank. Easy to grip knobs are then tightened to set the length of the rod to that desired length. The mounting brackets fit over and around the upper end of the opposed sides of the tank sidewall. The brackets lower the rod sufficiently into the tank so that the upwardly extending blade remains below the upper end of the tank sidewall. This allows the lid to be put back in place without removing the bag splitter. The laterally flexible, downwardly extending rim of the lid re-secure and re-seal around the sidewall and brackets to seal the top of the tank. Because the bag splitter remains inside the tank, the home owner does not have to store the splitter on a shelf or in a closet between uses, and then have to remember where it is several months later when more salt needs to be added to the brine tank. In addition, by keeping the splitter inside the brine tank, its blade does not pose a danger such as when sitting on a shelf or in a closet. The blade also has a guard or sheath to prevent it from cutting into or otherwise damaging the lid.

A still further advantage of the present water softener brine tank bag splitter is its stabilizing of the brine tank sidewall and ease of use. When the lid is removed to fill an empty or half empty tank, the thin, laterally flexible, sidewall of the brine tank provides a less than stable platform for resting a heavy bag of salt pellets, such as when pouring the pellets into the tank. The upper end of the sidewall is prone to buckling laterally. By joining two opposed sides of the sidewall, the set length of the splitter stiffens the upper end of the sidewall to provide a more stable platform for resting all or some of the weight of the salt bag when pouring the salt pellets into the tank. Only a portion of the weight of the salt bag is needed for the splitter blade to split open the bag. The length of the opening formed in the bag by the blade is sufficiently long that the salt pellets quickly gush out into the tank. As salt bag empties and its center of gravity shifts, the person pushes the rear hanging portion of the bag forward and over the open end of the tank. By increasing the stability of the upper end of the tank sidewall, freeing up both hands of the person picking up the sealed bag, resting a portion of the bag weight on the stiffened upper end of the sidewall, using the weight of the bag to split it open and quickly dispensing the salt into the tank, the present brine tank bag splitter invention improves overall ease of use and safety during the awkward and difficult process of picking up and pouring a heavy, drooping bag of salt into the brine tank.

A still further advantage of the present water softener brine tank bag splitter is that it maintains the seal between the tank lid and its sidewall. The mounting brackets loop over and around the upper end of the tank sidewall. The bracket loops are relatively thin and allow the lateral flexibility of the upper end of the tank sidewall and the lateral flexibility of the rim of the lid to accommodate the brackets and maintain the seal between the lid and sidewall. The salty vapor and humidity inside the tank does not propagate into the air inside a residential home or office building.

A still further advantage of the present water softener brine tank bag splitter is its pour speed. The bag splitter forms a long slit in the salt bag so that the pellets immediately gush out into the tank. The bag is emptied of salt pellet in small fraction of the time normally needed to empty a conventional salt bag. Instead of having to hold up a heavy salt bag three and a half to six feet in the air for a half minute or more while the salt pellets slowly pour into the tank, the bag can be emptied in as little a 2 or 3 seconds. This improved dispensing speed reduces the prolonged and awkward lifting effort, which reduces the possibility of injury.

Various other features and advantages of the present invention will be made apparent by making reference to the following detailed description, claims and drawings.

BRIEF DESCRIPTION OF THE DRAWINGS

The drawings illustrate preferred embodiments presently contemplated for carrying out the invention.

DESCRIPTION OF THE PREFERRED EMBODIMENTS

Embodiments of the invention relate to a universal bag splitting device having an adjustable rod assembly and a cutting blade extending from the rod assembly for splitting open bags of materials. A length of the bag splitting device is adjustable via the rod assembly. The bag splitting device further includes a plurality of brackets that are interchangeable at the ends of the rod assembly. The bag splitting device may be mounted and/or supported via the plurality of brackets.

Figure 1:
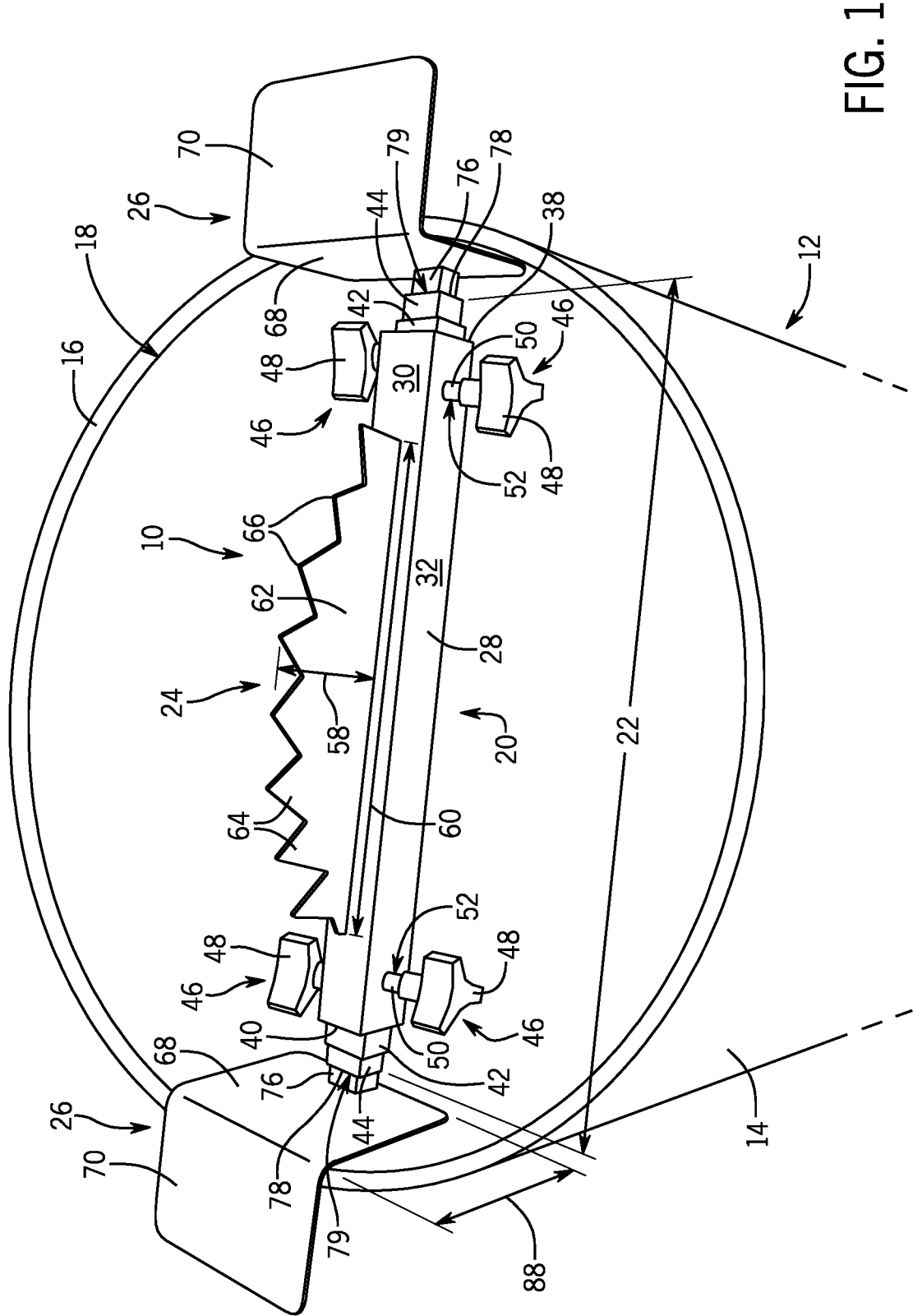
FIG. 1 is a perspective view of a universal bag splitting device supported on a container, according to an embodiment of the invention.

Referring to FIG. 1, a perspective view of a universal or adaptable bag splitting device or assembly 10 supported on a container 12 is shown, according to an embodiment of the invention. Container 12 includes a sidewall 14 having a substantially circular shape. An upper edge 16 of sidewall 14 forms an opening 18 in container 12. As a non-limiting example, container 12 may be in the form of a conventional five-gallon bucket. Bag splitting device 10 includes a rod assembly 20 having an adjustable or variable length 22, a cutting knife or blade 24 extending from rod assembly 20 for splitting open bags of materials, and support brackets 26 coupled to rod assembly 20 for maintaining or sustaining the position of bag splitting device 10 with respect to container 12. In some embodiments, bag splitting device 10 further includes a guard or sheath 25 that covers cutting blade 24 when it is not in use to prevent wear on or damage to cutting blade 24, prevent people from injuring themselves on cutting blade and/or preventing the blade from cutting or otherwise damaging any lid placed over the container 12. Bag splitting device 10 is typically formed of metal, such as, for example, stainless steel or aluminum, but may be formed other materials, as appropriate. Preferably, but not necessarily, the material or materials used to form bag splitting device 10 are rust-proof or rust-resistant.

In FIG. 1, bag splitting device 10 is in a retracted position in which rod assembly 20 is as compact as possible. In other words, rod assembly 20 is at its shortest length 22, also referred to as its retracted length 22. Rod assembly 20 includes a central support rod 28 that is constructed with a substantially square shape with rounded corners. However, support rod 28 may be constructed with another shape, such as, for example, substantially rectangular or circular, in various embodiments. Support rod 28 includes a top surface 30, a first side surface 32, a second side surface 34 (shown in FIGS. 3 and 5), a bottom surface 36 (shown in FIG. 6), a first end 38, and a second end 40. In the embodiment of bag splitting device 10 of FIG. 1, support rod 28 is completely hollow. However, in some embodiments, support rod 28 may include additional support structure therein such as, for example, a plate or block centrally located between first and second ends 38, 40.

Rod assembly 20 further includes a primary extension rod 42 and a secondary extension rod 44 that may be used to extend length 22 of rod assembly 20. Primary and secondary extension rods 42, 44 are positioned within support rod 28 at each of its first and second ends 38, 40, with each secondary extension rod 44 also being positioned within one of primary extension rods 42. However, in some embodiments, rod assembly 20 may include primary and secondary extension rods 42, 44 at either first end 38 or second end 40 of support rod 28. Additionally, rod assembly 20 may not include secondary extension rod 44 or may include additional extension rods. In FIG. 1, bag splitting device 10 is the retracted position because primary and secondary extension rods 42, 44 are fully retracted within support rod 28. That is, primary extension rods 42 cannot be retracted any farther into support rod 28, and secondary extension rods 44 cannot be retracted any farther into primary extension rods 42. While FIG. 1 shows that primary and secondary extension rods 42, 44 do not fully fit within support rod 28 in the retracted position, primary and secondary extension rods 42, 44 may be designed to fit fully within support rod 28 in the retracted position in other embodiments.

Primary and secondary extension rods 42, 44 of rod assembly 20 are held in position using four securing devices 46. In the embodiment of bag splitting device 10 shown in FIG. 1, each securing device 46 is a fastener 46 having a handle or knob 48 and a threaded stud 50. However, in various embodiments, securing devices 46 may be in another form such as, for example, retractable pins (not shown) that operate in conjunction with a plurality of pin holes (not shown) on primary and secondary extension rods 42, 44. Two of fasteners 46 extend through openings 52 in first side surface 32 of support rod 28 and push against respective primary extension rods 42 in order to prevent movement of primary extension rods 42 with respect to support rod 28. The other two fasteners 46 extend through openings 54 (shown in FIGS. 3 and 5) on primary extension rods 42 and push against secondary extension rods 44 in order to prevent movement of secondary extension rods 44 with respect to primary extension rods 42. When primary and secondary extension rods 42, 44 are at least mostly retracted within support rod 28, fasteners 46 extending through openings 54 in primary extension rods 42 also extend through notches 56 (shown in FIGS. 3 and 5) at first and second ends 38, 40 of support rod 28 so as to permit primary and secondary extension rods 42, 44 to retract farther within support rod 28. Notches 56 also act as a stop for fasteners 46 extending into primary extension rods 42 so that primary extension rods 42 do not retract too far into support rod 28. As discussed in more detail with respect to FIGS. 3 and 5-6, fasteners 46 may be loosened to allow primary and secondary extension rods 42, 44 to extend out from support rod 28 and retightened such that bag splitting device 10 may be in an extended position.

In addition to housing primary and secondary extension rods 42, 44, support rod 28 of rod assembly 20 provides support for cutting blade 24. In the embodiment of bag splitting device 10 of FIG. 1, cutting blade 24 extends from top surface 30 of support rod 28 such that a height 58 of cutting blade 24 is substantially perpendicular to top surface 30 and a length 60 of cutting blade 24 is substantially parallel to length 22 of rod assembly 20. However, cutting blade 24 may extend from any of top surface 30, first side surface 32, second side surface 34, bottom surface 36 or a combination thereof and may extend from such surfaces 30, 32, 34, 36 at various angles, as desired or required to adjust the performance of bag splitting device 10 for different applications. In addition, while only one cutting blade 24 is shown, bag splitting device 10 may include one or more cutting blades 24 extending from the same or different surfaces 30, 32, 34, 36 of support rod 28. The additional cutting blades 24 may be adapted for different applications.

Cutting blade 24 may be formed integrally with support rod 28 or may be attached to support rod 28. In embodiments in which cutting blade 24 is not integrally formed with support rod 28, cutting blade 24 may be attached to support rod 28 in a semipermanent or permanent manner such as, for example, by welding cutting blade 24 to support rod 28. Cutting blade 24 may also be removably attached to top surface 30 in a manner that allows cutting blade 24 to be easily replaced. As a non-limiting example, cutting blade 24 may be attached to support rod 28 by inserting cutting blade 24 into a slot (not shown) formed in top surface 30 of support rod 28. As another non-limiting example, cutting blade 24 may be removably attached to support rod 28 via a clamp (not shown). As yet another non-limiting example, cutting blade 24 may include a base (not shown) that slides into a bracket (not shown) mounted on or formed integrally with support rod 28.

In the embodiment of bag splitting device 10 of FIG. 1, cutting blade 24 includes a substantially semicircular body 62 and a plurality of teeth or spikes 64 extending therefrom. Each spike 64 includes a tip 66 pointing in an upward direction either perpendicularly or obliquely away from top surface 30 of support rod 28. In FIG. 1, tips 66 of spikes 64 do not come to a sharp point for safety purposes. However, tips 66 may come to a sharp point in other embodiments so that bag splitting device 10 may split open thicker bags or bags constructed of a tougher material.

In addition, cutting blade 24 may be formed in a variety of different configurations. As a non-limiting example, cutting blade 24 may be formed with a substantially rectangular body 62 and spikes 64 extending upward therefrom. As another non-limiting example, cutting blade 24 may be formed without body 62 and with spikes 64 extending directly from support rod 28. Further, while spikes 64 of cutting blade 24 are shown as oriented in different directions such that each tip 66 points in at least a somewhat different direction, one or more spikes 64 may be oriented in substantially the same direction such that each tip 66 points in substantially the same direction. As a non-limiting example, spikes 64 may be arranged on cutting blade 24 such that each tip 66 of spikes 64 points in a purely vertical direction. Additionally, in some embodiments, cutting blade 24 may include only one spike 64 or body 62 may include a smooth cutting edge without spikes 64.

Figure 2A:
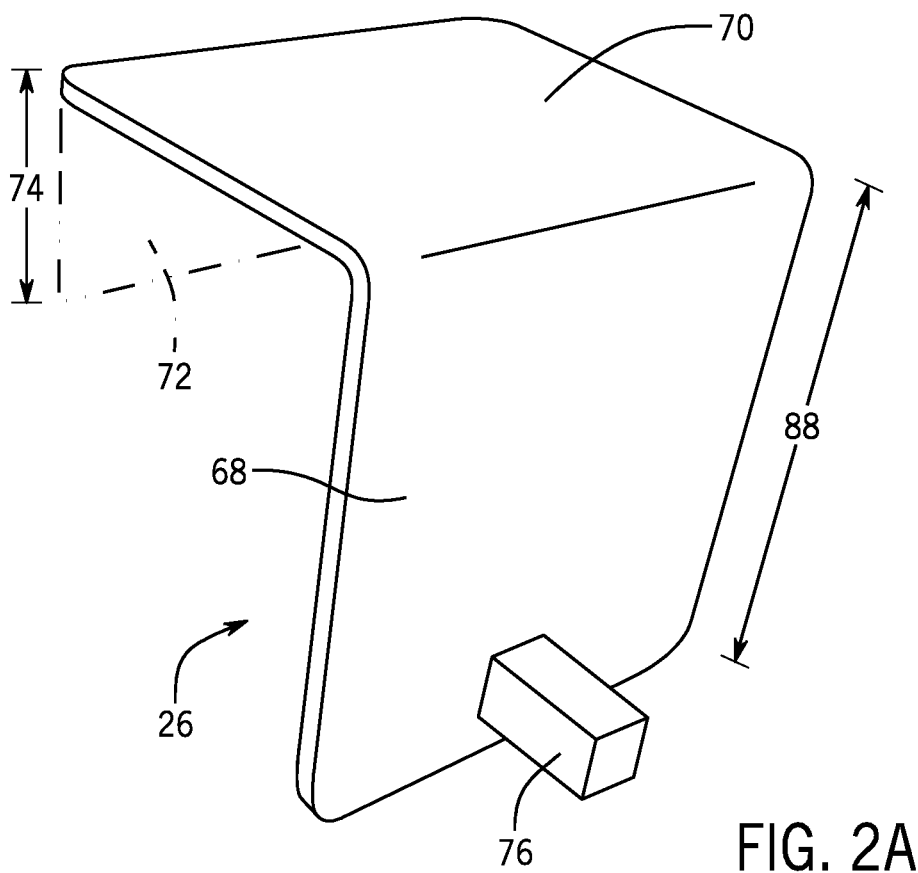
FIGS. 2A-2B are perspective and side views, respectively, of a support bracket useable with the universal bag splitting device of FIG. 1, according to an embodiment of the invention.
Figure 2B:
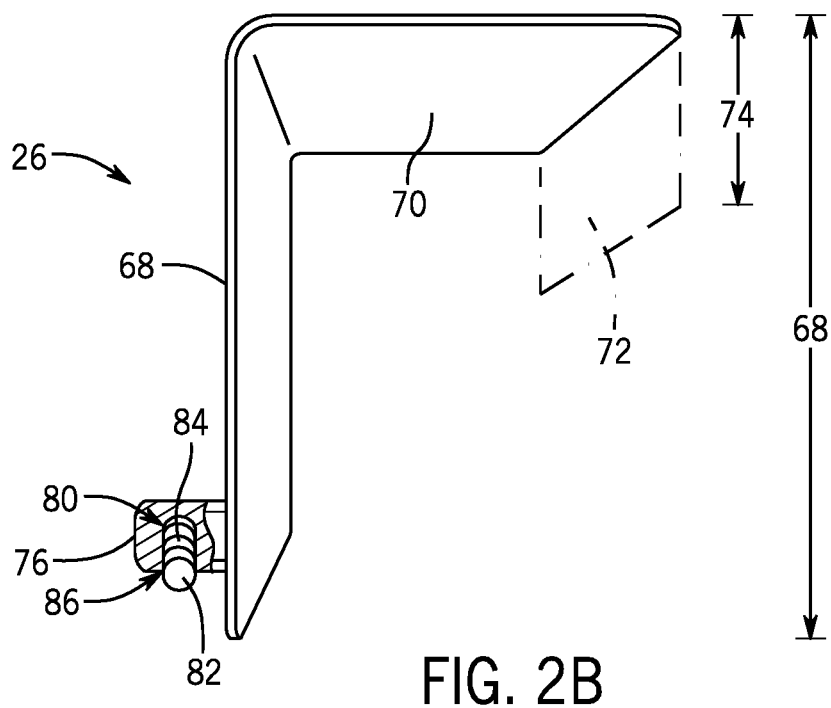

Cutting blade 24 and rod assembly 20 may be used in conjunction with container 12 via support brackets 26 of bag splitting device 10. Support brackets are illustrated in greater detail in FIGS. 2A-2B, which show perspective and side views, respectively, of support brackets 26, according to an embodiment of the invention. Support brackets 26 are L-shaped angle brackets having a first, substantially vertical plate 68 integrally formed with a second, substantially horizontal plate 70 extending from first plate 68 such that first and second plates 68, 70 are substantially perpendicular to each other. However, in some embodiments, first and second plates 68, 70 are separate plates that are connected together using a method such as, for example, welding. In addition, as shown in FIGS. 2A-2B, support brackets 26 may include an optional third, substantially vertical plate 72. A height 74 of third plate 72 may be such that support brackets 26 are J-shaped brackets instead of L-shaped brackets. However, third plates 72 may also be taller such that height 74 causes support brackets 26 to be substantially U-shaped. When support brackets 26 include third plate 72, second plate 70 may be shorter such that support brackets 26 essentially hook over sidewall 14 of container 12 to provide more stability to support brackets 26.

Each support bracket 26 further includes a connector 76 either integrally formed with or connected to first plate 68. Connectors 76 enable a connection between each support bracket 26 and each end 78 of rod assembly 20. In the embodiment of bag splitting device 10 of FIG. 1, each end 78 of rod assembly 20 is located on one of secondary extension rods 44. As shown in FIGS. 2A-2B, each connector 76 is a square drive 76, which is sized to fit within an opening 79 (shown in FIG. 5) at each end 78 of rod assembly 20/secondary extension rods 44. Each square drive 76 includes a ball plunger mechanism 80 (shown in FIG. 2B) including a ball 82 and a spring 84 within a bored cylinder 86. When square drives 76 are inserted into ends 78, each ball 82 is depressed into its corresponding spring 84, with each spring 84 being compressed within bored cylinder 86.

Each square drive 76 is held within rod assembly 20 because spring 84 pushes ball 82 to contact secondary extension rod 44 and the pressure ball 82 exerts on secondary extension rod 44 is enough to maintain the position of each square drive 76 within each secondary extension rod 44. However, in some embodiments, secondary extension rods 44 may include a detent (not shown) that corresponds with ball 82 on square drive 76 and locks square drive 76 into secondary extension rods 44 when ball 82 is engaged therewith. In that case, support brackets 26 and/or secondary extension rods 44 may include a release mechanism (not shown) that would retract and/or push ball 82 out of the detent in secondary extension rods 44 to enable removal of square drive 76 from secondary extension rods 44. In either case, square drive 76 is considered to be a quick change connector that allows support brackets 26 to be quickly inserted and removed from ends 78 of rod assembly 20/secondary extension rods 44. Further, since each support bracket 26 includes square drive 76, support brackets 26 are interchangeable at ends 78.

While support brackets 26 are shown with square drives 76 for making the connection with rod assembly 20, connectors 76 may be in another form and/or may be included on rod assembly 20. As a non-limiting example, rod assembly 20 could include a quick change chuck (not shown) that engages corresponding connectors on support brackets 26 via a slidable locking mechanism (not shown). In addition, while the connection between rod assembly 20 and support brackets 26 is preferably in the form of a quick change connection, the connection may be a made via another type of removable connection. As a non-limiting example, the connection may be made via threaded connectors (not shown) on rod assembly 20 and support brackets 26. As another non-limiting example, support brackets 26 may be connected to rod assembly 20 using one or more fasteners (not shown).

Referring again to FIG. 1, support brackets 26 are configured such that each second plate 70 rests on top of sidewall 14 of container 12 and each first plate 68 extends down into container 12 in order to position rod assembly 20 below upper edge 16 of sidewall 14 of container 12. Preferably, first plates 68 have a height 88 that allows the highest point of cutting blade 24 to be positioned underneath or at least level with second plates 70. In this manner, cutting blade 24 can be recessed with respect to second plates 70 of support brackets 26 and/or upper edge 16 of sidewall 14 of container 12.

It is desirable to recess cutting blade 24 using support brackets 26 for both safety and operational purposes. Initially, those using bag splitting device 10 in container 12 will be less likely to injure themselves on cutting blade 24 if cutting blade 24 is recessed within container 12, as sidewall 14 will partially block access to cutting blade 24. In addition, the farther cutting blade 24 is recessed within container 12, the less likely materials from bags being split open by cutting blade 24 will spill outside of container 12. However, in some embodiments, first plates 68 may be designed with a shorter height 88 that allows cutting blade 24 to extend above second plates 70 so that bag splitting device 10 takes up less volume within container 12. Further, in various embodiments, rather than, or in addition to shortening height 88 of first plates 68, connector 76 may be moved higher on first plates 68 such that it is closer to second plate 70 and such that rod assembly 20 is positioned near upper edge 16 of sidewall 14 of container 12.

Regardless of where exactly rod assembly 20 is positioned with respect to support brackets 26, bag splitting device 10 may be used to empty bags of materials directly into container 12 when support brackets 26 are engaged with sidewall 14 of container 12. Initially, a bag of materials, such as, for example, seed, fertilizer, salt, snow melt, joint compound, concrete mix, or mortar mix, may be lowered onto cutting blade 24 such that spikes 64 of cutting blade 24 puncture/split open the bag. Once the bag is split open, the materials within the bag will empty into container 12 through opening 18. Then, since support brackets 26 are not mounted onto sidewall 14 of container 12, bag splitting device 10 may be easily removed from container 12 in order to access the materials emptied into container 12. The materials may then be used within container 12 or may be easily transferred to another container or machine for use therein.

While FIG. 1 only illustrates bag splitting device 10 as being used with container 12 having only one, substantially circular sidewall 14, bag splitting device 10 may be used with containers of various shapes, as long as the containers include at least one sidewall that can bear the weight of bag splitting device 10 when engaged with support brackets 26. As a non-limiting example, bag splitting device 10 may be used with a substantially square or rectangular container having four sidewalls, with support brackets 26 resting on opposite sidewalls of the container. As another non-limiting example, bag splitting device 10 may be used with a wheel barrow, with support brackets 26 resting on left and right sidewalls of the wheel barrow from the perspective of one standing behind or in front of the wheel barrow.

In addition, bag splitting device 10 may be used outside of a container. Initially, bag splitting device 10 may be positioned above a container, with support brackets 26 positioned on other apparatus. As a non-limiting example, support brackets 26 may be positioned on tables, shelves, or other similar structures space apart from each other, with a container sitting underneath bag splitting device 10 to catch materials from bags split open by cutting blade 24. Furthermore, bag splitting device 10 may be used directly in machines without the need to transfer materials from a container. As a non-limiting example, bag splitting device 10 may be used with seed, fertilizer, or salt spreaders.

Figure 3:
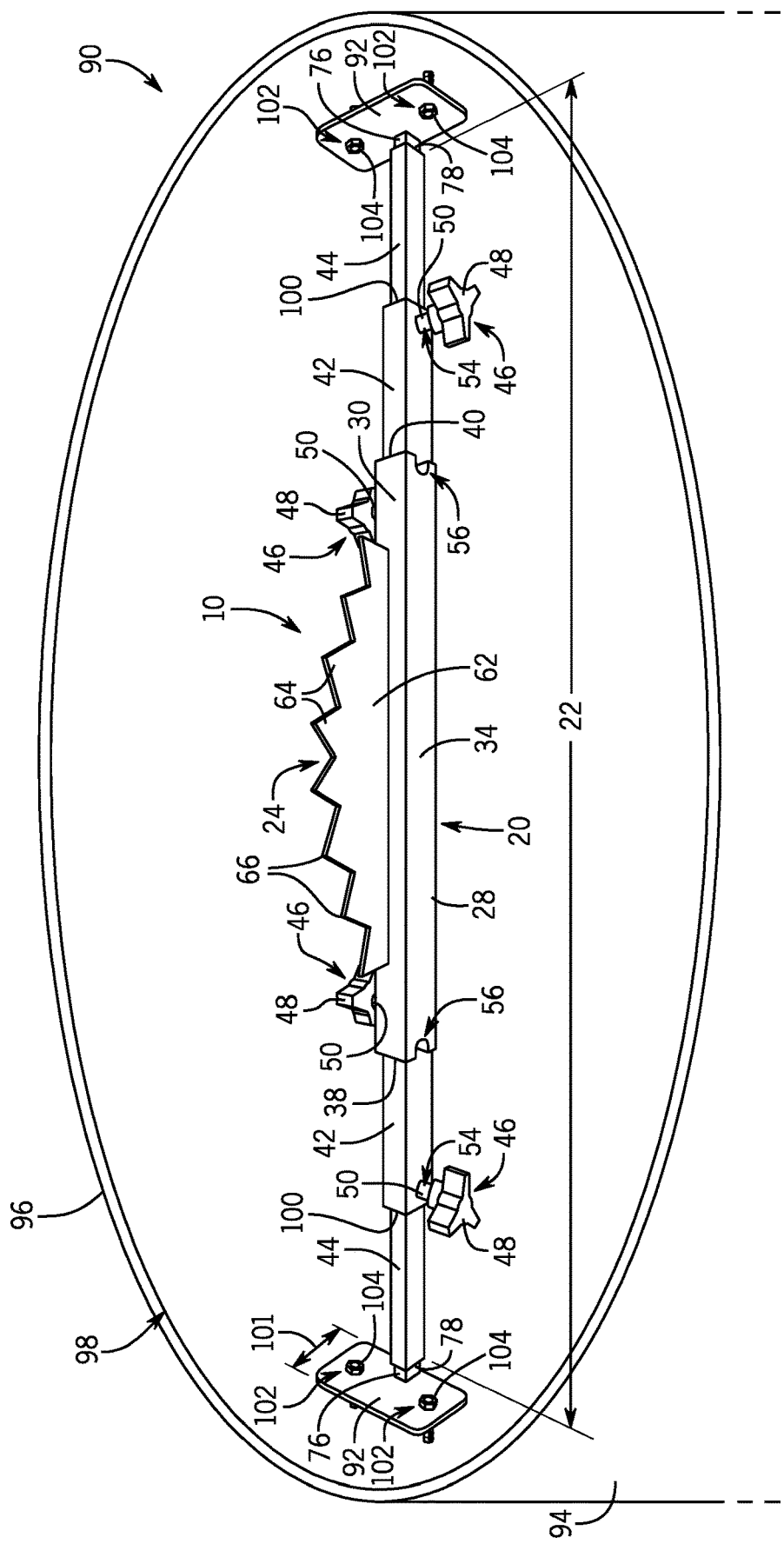
FIG. 3 is a perspective view of the universal bag splitting device of FIG. 1 mounted within a container, according to an embodiment of the invention.
Figure 4:
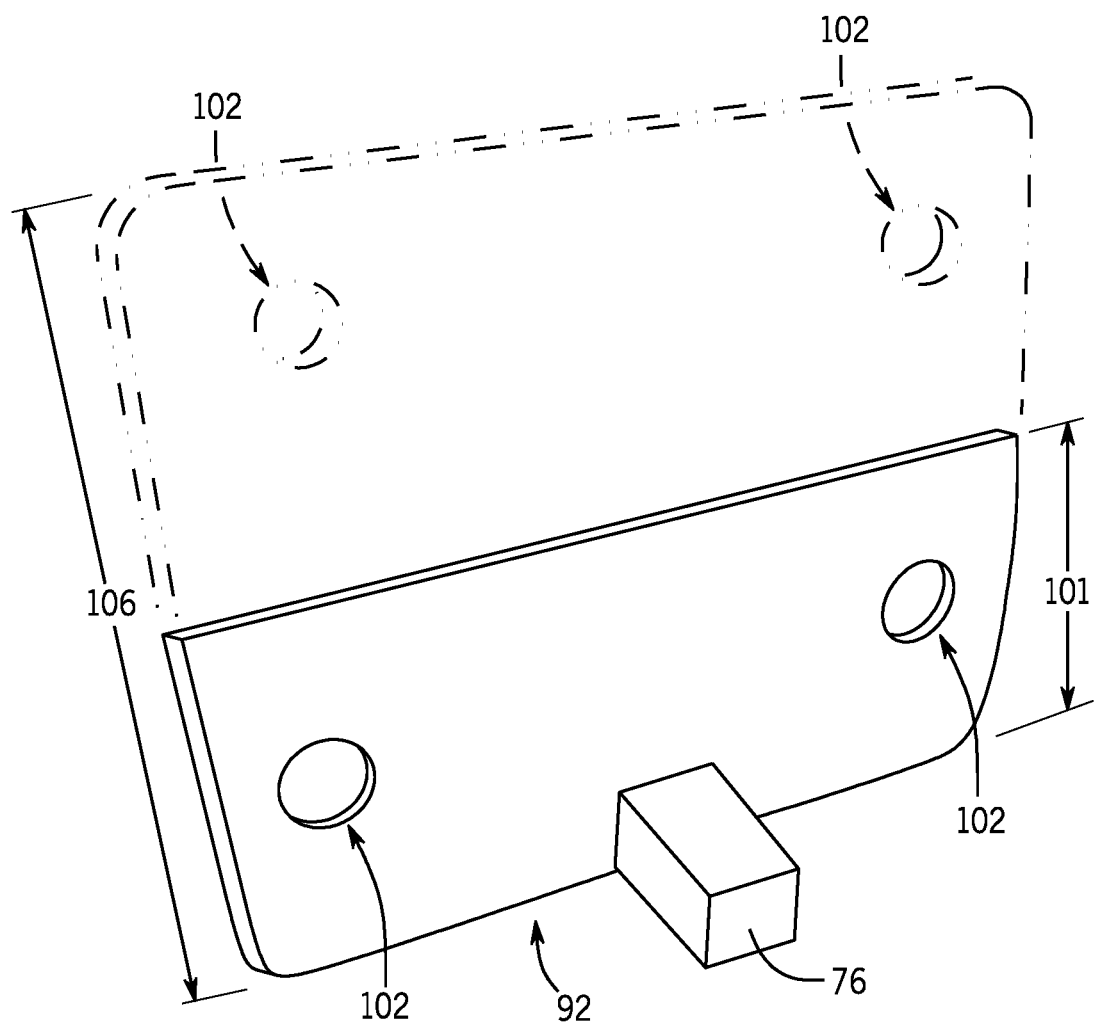
FIG. 4 is a perspective view of a mounting bracket useable with the universal bag splitting device of FIG. 1, according to an embodiment of the invention.

Referring now to FIGS. 3-4, FIG. 3 shows a perspective view of bag splitting device 10 of FIG. 1 mounted within a container 90 using mounting brackets 92, and FIG. 4 shows a perspective view of one mounting bracket 92, according to an embodiment of the invention. Initially, FIG. 3 illustrates how bag splitting device 10 may be used with containers of various sizes by adjusting variable length 22 of rod assembly 20 using first and/or secondary extension rods 42, 44. Container 90 of FIG. 3 is similar to container 10 of FIG. 1 in that container 90 includes a substantially circular sidewall 94 having an upper edge 96 forming an opening 98. However, container 90 is larger than container 10 of FIG. 1. As a non-limiting example, container 90 may be a water softener brine tank.

When bag splitting device 10 is in the retracted position, rod assembly 20 is not long enough to reach across opening 98 of container 90. Therefore, bag splitting device 10 is adjusted into an expanded position by increasing variable length 22 of rod assembly 20 and secured in position using fasteners 46. In the expanded position shown in FIG. 2, primary and secondary extension rods 42, 44 extend out from first and second ends 38, 40 of support rod 28 of rod assembly 20. That is, primary extension rods 42 extend out of first and second ends 38, 40 of support rod 28, and secondary extension rods 44 extend out of ends 100 of primary extension rods 44.

Rod assembly 20 is shown in FIG. 3 with primary and secondary extension rods 42, 44 extending an approximately equal distance from support rod 28 such that support rod 28 is centered with respect to ends 78 of rod assembly 20/secondary extension rods 44. However, support rod 28 does not necessarily have to be centered with respect to ends 78. Length 22 of rod assembly 20 may also be adjusted by retracting or extending primary and secondary extension rods 42, 44 in an uneven manner such as, for example, by extending or retracting primary extension rod 42 and/or secondary extension rod 44 at only first end 38 or second end 40 of support rod 28. The extension and retraction of primary and secondary extension rods 42, 44 will be explained in greater detail below with respect to FIGS. 5-6.

In addition to the above, FIG. 3 illustrates how bag splitting device 10 may not only be removably supported on a container, as shown in FIG. 1, but also mounted within a container. Bag splitting device 10 is not limited to use with support brackets such as, for example, support brackets 26 shown in FIGS. 1-2B. Bag splitting device 10 may be used with mounting brackets such as, for example, mounting brackets 92 shown FIGS. 3-4. Mounting brackets 92 have a height 101 and include mounting holes 102 for fasteners 104 to mount bag splitting device 10 within container 90. While mounting brackets 92 are shown with two mounting holes 102 in FIG. 3, mounting brackets 92 may include only one mounting hole 102 or additional mounting holes 102 in various embodiments. Further, in some embodiments, mounting brackets 92 may be larger in width and/or height. FIG. 4 illustrates a non-limiting example of a larger mounting bracket 92 that may optionally have an increased height 106 and/or two additional mounting holes 102.

Furthermore, mounting brackets 92 are not limited to use in containers and may be used to mount bag splitting device 10 between any combination of two additional types of applicable structures such as, for example, walls, cabinets, tables, and shelves. Mounting brackets 92 may be mounted to the different types of structures using various types of fasteners such as, for example, bolts and screws. In the embodiment of bag splitting device 10 of FIG. 3, fasteners 104 used in mounting brackets 92 are in the form of bolts 104 extending through mounting holes 102 in mounting brackets 92 and mounting holes (not shown) in sidewall 94 of container 90. Bolts 104 may be secured in position by tightening nuts (not shown) onto sidewall 94 outside of container 90. Washers (not shown) and/or a bolt tie plate (not shown) may be used in between the nuts and sidewall 94. Sidewall 94 of container 90 may include pre-drilled mounting holes. However, mounting holes may need to be formed in sidewall 94 prior to mounting bag splitting device 10 within container 90.

In FIG. 3, mounting brackets 92 of bag splitting device 10 are mounted in container 90 below upper edge 96 such that the highest point of cutting blade 24 is underneath or at least level with upper edge 96. In this manner, cutting blade 24 may be recessed with respect to upper edge 96. Mounting brackets 92 may also be designed such that height 106 automatically recesses cutting blade 24 in a similar manner to first plates 68 of support brackets 26 of FIGS. 1-2B. It is desirable to recess cutting blade 24 for similar reasons discussed above with respect to support brackets 26. Initially, users of bag splitting device 10 are less likely be injured on cutting blade 24 if cutting blade 24 is recessed in container 90, as sidewall 94 of container 90 will partially block access to bag splitting device 10. Further, the lower cutting blade 24 is positioned within container 90, the less likely materials from bags being split open by cutting blade 24 will spill outside of container 90. Additionally, if cutting blade 24 is recessed in container 90 rather than extending through opening 98, a container cover (not shown) may be placed over opening 98. However, some types of container covers may still be used with container 90 is cutting blade 24 extends through opening 98.

As shown in FIG. 4, in addition to mounting holes 102, each mounting bracket 92 includes the same connector 76 as support brackets 26. This allows each mounting bracket 92 to connect to ends 78 of rod assembly 20. Connector 76 is typically, but not necessarily, centered between mounting holes 102 on mounting bracket 92, as shown in FIGS. 3-4, to provide stability in mounting bag splitting device 10. However, connector 76 may be positioned on mounting bracket 92 anywhere along height 101 or height 106, depending on the desired position for rod assembly 20 and/or cutting blade 24 with respect to mounting brackets 92. As a non-limiting example, connector 76 may be centered vertically along height 101 or height 106. As another non-limiting example, connector 76 may be positioned near or at the top of height 101 or height 106 as opposed to near or at the bottom or height 101 or height 106, as shown in FIGS. 3-4.

The removable connection to rod assembly 20 via connector 76 provides the benefit of being able to individually install mounting brackets 92 in container 90 before attaching them to rod assembly 20. After mounting brackets 92 are installed using fasteners 104, length 22 of rod assembly 20 may be expanded to reach mounting brackets 92 in order to connect ends 78 of rod assembly 20 to mounting brackets 92. It may be much easier to mount bag splitting device 10 this manner because the installer does not need to hold or have an assistant hold rod assembly 20 during installation.

In addition to the above-noted installation benefit, connector 76 provides the benefit of making support brackets 26 and mounting brackets 92 interchangeable at ends 78 of rod assembly 20. This bracket interchangeability makes bag splitting device 10 quickly adaptable to a variety of different configurations including a removably supported configuration, such that shown in FIG. 1, and a mounted configuration such as that shown in FIG. 3. Bag splitting device 10 may additionally be adapted to a combination or hybrid of the mounted and supported configurations in which one support bracket 26 and one mounting bracket 92 are used. The hybrid configuration is referred to as a mounted and supported configuration. As a non-limiting example of the mounted and supported configuration, a container may have an irregular shape that would make it advantageous to use mounting bracket 92 on one side of bag splitting device 10 and support bracket 26 on the other side. As another non-limiting example, one may wish to mount one side of bag splitting device 10 to a wall using mounting bracket 92 and have the other side of bag splitting device 10 rest on another structure, such as, for example, a container, cabinet, table, or shelf, to which mounting is not desirable, practical, and/or possible.

Figure 5:
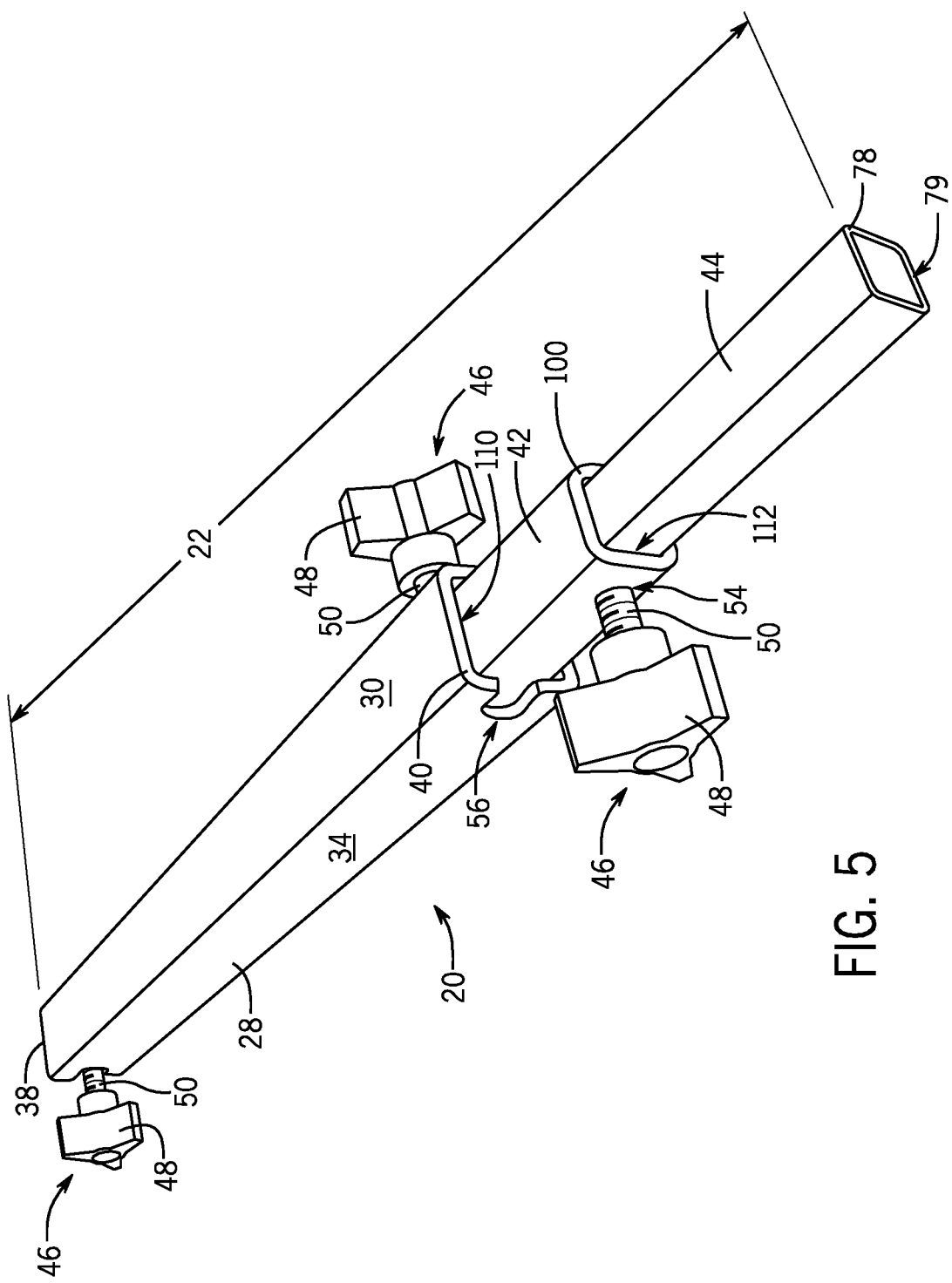
FIG. 5 is a perspective view of a rod assembly of the universal bag splitting device of FIG. 1, according to an embodiment of the invention.
Figure 6:
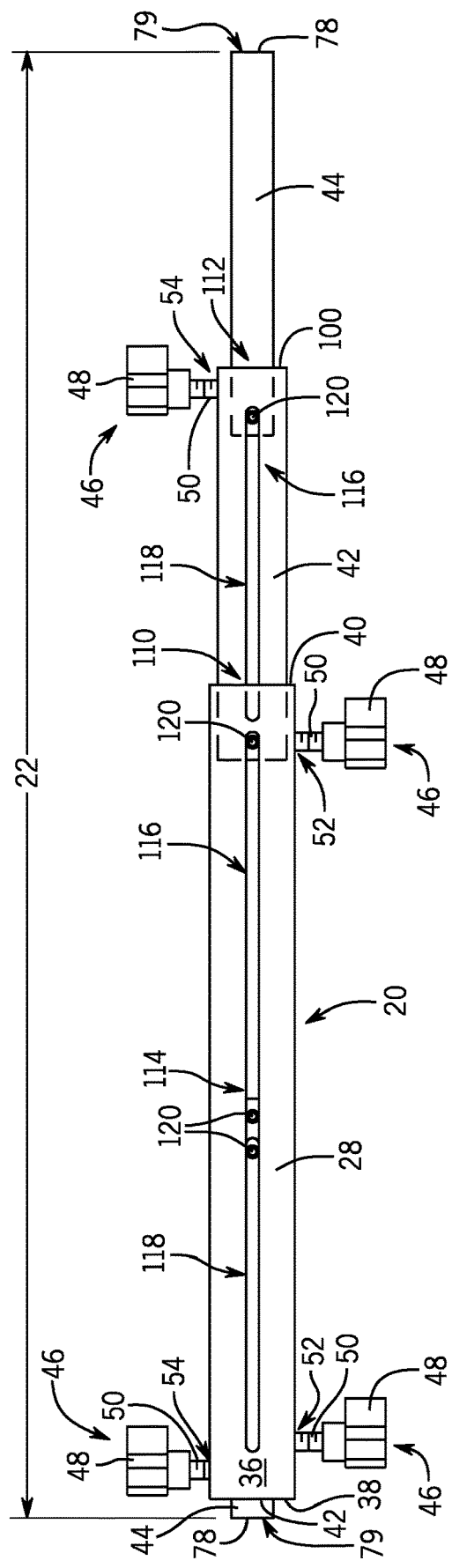
FIG. 6 is a bottom view of the rod assembly of FIG. 5, according to an embodiment of the invention.
Figure 7:
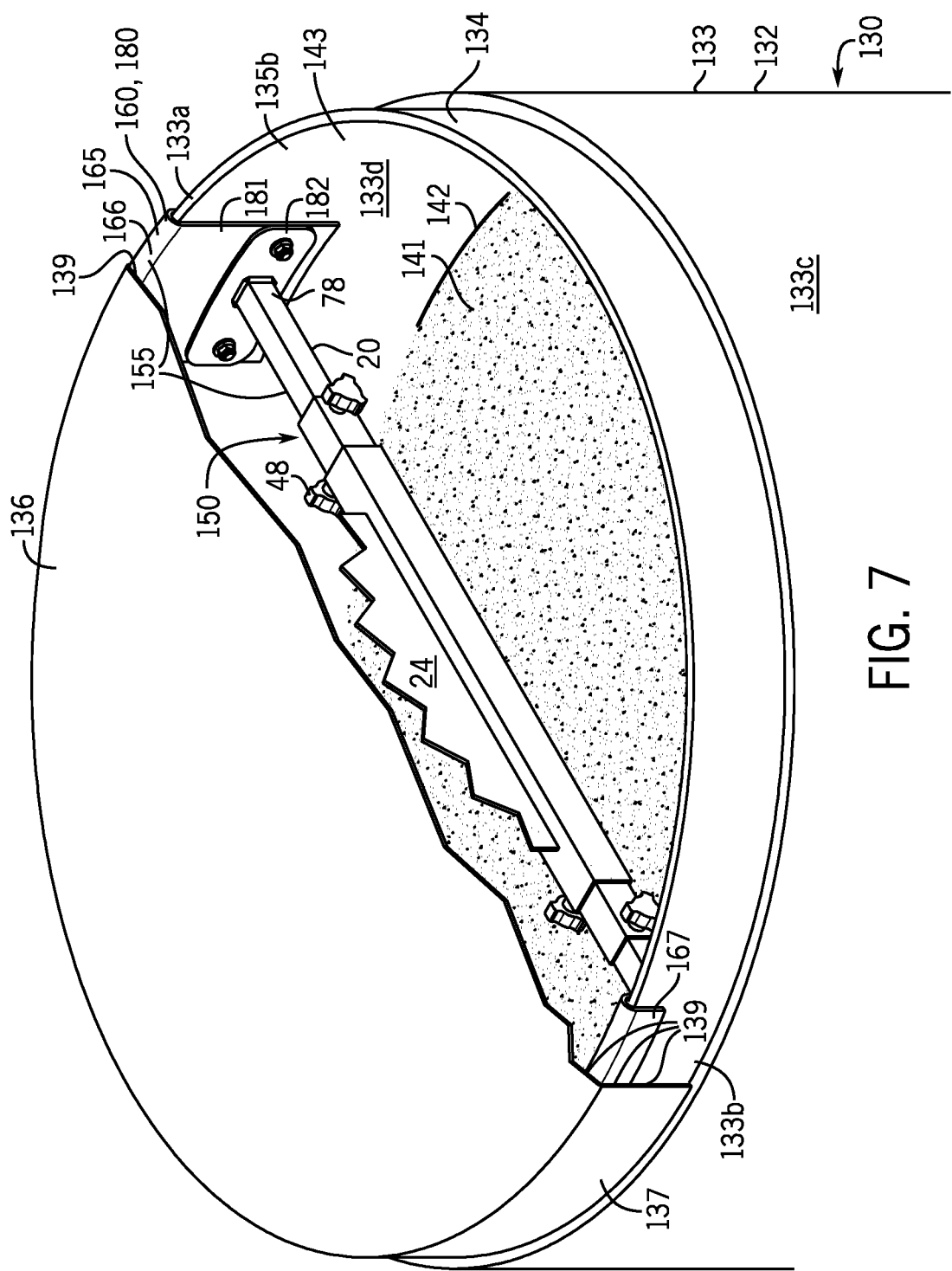
FIG. 7 is perspective view of the universal bag splitting device with its looped vertical mounting brackets secured over the rim of a water softener brine tank with the tank lid sealed around the outside of the rim and mounting brackets.
Figure 8:
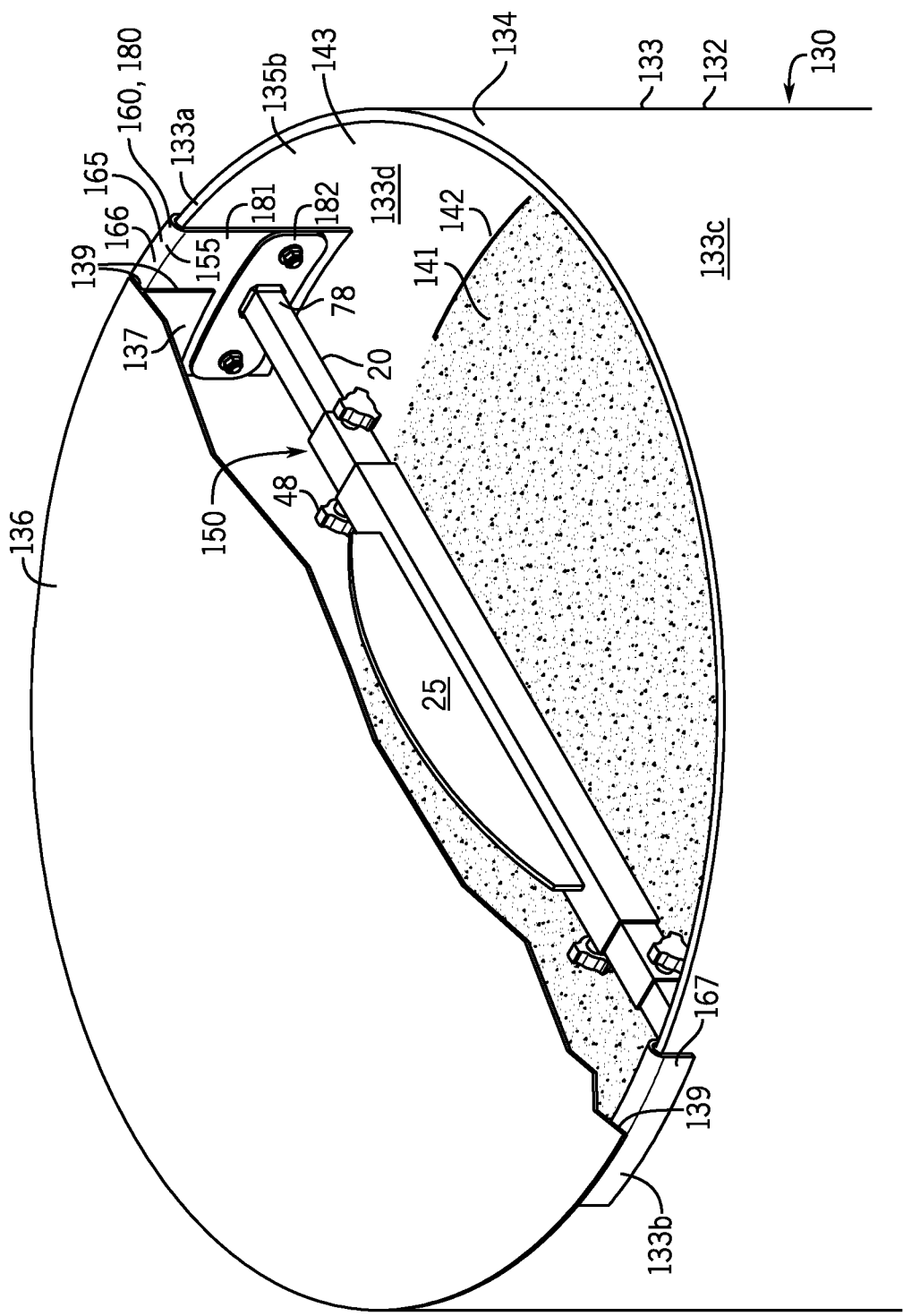
FIG. 8 is perspective view of the universal bag splitting device with its looped vertical mounting brackets secured over the rim of a water softener brine tank with the tank lid sealed around the outside of the rim and mounting brackets.

Referring now to FIGS. 5-6, the expansion and retraction of rod assembly 20 will be discussed further. FIG. 5 illustrates a perspective view of rod assembly 20 of bag splitting device 10, according to an embodiment of the invention. FIG. 6 illustrates a bottom view of rod assembly 20 of bag splitting device 10, according to an embodiment of the invention. In FIGS. 5-6, rod assembly 20 is retracted at end 78 near first end 38 of support rod 28 and is expanded at end 78 near second end 40 of support rod 28.

In order to expand rod assembly 20 from the retracted position to the expanded position at the expanded end 78 of rod assembly 20 in FIGS. 5-6, fasteners 46 must first be loosened. Fastener 46 extending through opening 52 on first side surface 32 (shown in FIG. 1) of support rod 28 is associated with primary extension rod 42, and fastener 46 extending through opening 54 on primary extension rod 42 is associated with secondary extension rod 44. Once their corresponding fasteners 46 are loosened, primary extension rod 42 may extend out of second end 40 of support rod 28 through an opening 110, and secondary extension rod 44 may extend out of end 100 of primary extension rod 42 through an opening 112. After primary and second extension rods 42, 44 are in the desired position, fasteners 46 must then be retightened to hold primary extension rod 42 in position with respect to support rod 28 and to hold secondary extension rod 44 in position with respect to primary extension rod 42.

Both ends 78 of rod assembly 20 may be extended in this manner with or without brackets connected to rod assembly 20 at ends 78 of rod assembly 20 via opening 79. Regardless of whether one or both ends 78 of rod assembly 20 are extended, the end result is that length 22 of rod assembly 20 is increased. Rod assembly 20 may be increased to any length 22 between the retracted length 22 shown in FIG. 1 and a maximum length 22 where primary and secondary extension rods 42, 44 are fully extended. In order to retract primary and secondary extension rods 42, 44 for storage or for use in a different application, one must simply loosen the relevant fasteners 46, slide the extended primary and/or secondary extension rods 42, 44 back into support rod 28 and/or its corresponding primary extension rod 42, and retighten fasteners 46.

Referring now to FIG. 6, primary and secondary extension rods 42, 44 of rod assembly 20 may extend and retract via a telescoping system 114. Telescoping system 114 includes a slot 116 formed in bottom surface 36 of support rod 28, slots 118 formed primary extension rods 42, and a plurality of pins 120 extending from each primary and secondary extension rods 42. Pins 120 on primary extension rods 42 extend into slot 116 of support rod 28, and pins 120 on secondary extension rods 44 extend into slots 118 on secondary extension rods 44. Slots 116, 118 and pins 120 operate together such that primary extension rods 42 are slidably connected to support rod 28 and secondary extension rods 44 are slidably connected to primary extension rods 42.

Slots 116, 118 and pins 120 allow primary and secondary extension rods 42, 44 to extend and retract with more stability. Also, slots 116, 118 and pins 120 prevent primary and secondary extension rods 42, 44 from being removed from rod assembly 20 at full extension. That is, when primary extension rods 42 are being extended through openings 110 at first and second ends 38, 40 of support rod 28, primary extension rods 42 cannot fall out of support rod 28 because pins 120 on primary extension rods 42 are bound by slot 116 in support rod 28. In a similar manner, pins 120 on secondary extension rods 44 are bound by slots 118 on primary extension rods 42. Thus, when a user is extending length 22 of rod assembly 20 to fit a particular application, a user will not need to worry about accidently pulling primary and secondary extension rods 42, 44 out of rod assembly 20 and then having to reinsert them to continue use of bag splitting device 10.

In some embodiments, pins 120 are retractable. In that case, pins 120 may be pushed through their respective slots 116, 118 and into their respective primary and secondary extension rods 42, 44 so that primary and secondary extension rods 42, 44 may be removed from rod assembly 20. As such, primary and secondary extension rods 42, 44 of rod assembly 20 may be more easily replaced or modified if necessary.

Beneficially, embodiments of the invention thus provide a universal bag splitting device that may be easily modified to fit a variety of different applications. The bag splitting device includes a rod assembly having extension rods that may be extended and retracted with respect to a support rod. The extension rods may be used to adjust a length of the rod assembly to fit differently sized areas in containers, machines, and other structures. In addition, the bag splitting device includes a plurality of interchangeable brackets that are connectable to the rod assembly and may be used to mount the bag spitting device, support the bag spitting device, or a combination thereof. The bag splitting device further includes a cutting blade extending from the rod assembly that may be used to split open bags of materials such that the materials are conveniently emptied directly into containers and machines in which the bag splitting device is mounted or on which the bag splitting device is supported.

According to one embodiment of the present invention, a universal bag splitting device includes a rod assembly with an adjustable length, a cutting blade attached to a surface of the rod assembly, and a pair of interchangeable brackets connectable to first and second ends of the rod assembly. The pair of interchangeable brackets are configured to maintain a position of the rod assembly when the universal bag splitting device is in use.

According to another embodiment of the present invention, a universal bag splitting apparatus includes a rod assembly having a first end, a second end, a support rod, and a first primary extension rod that is adjustable with respect to the support rod at the first end of the rod assembly to modify a length of the rod assembly. The universal bag splitting apparatus further includes a cutting blade attached to the support rod of the rod assembly, a first bracket connectable to at least the first end of the rod assembly, and a second bracket connectable to at least the second end of the rod assembly. The first and second brackets are configured to sustain a position of the rod assembly in at least one configuration selected from the group of a mounted configuration, a supported configuration, and a mounted and supported configuration.

According to yet another embodiment of the present invention, a kit for a universal bag splitting assembly includes an adjustable rod assembly. The adjustable rod assembly includes a support rod with a first end and a second end. The adjustable rod assembly also includes one or more extension rods positioned at each of the first end of the support rod and the second end of the support rod for adjusting a length of the rod assembly. Each extension rod is moveable with respect to the support rod, another extension rod of the one or more extension rods, or a combination thereof. The universal bag splitting assembly additionally includes a cutting blade attachable to a surface of the support rod between the first and second ends of the support rod and a plurality of interchangeable brackets that are attachable to the rod assembly and capable of sustaining a position of the rod assembly.

The universal bag splitter 10 is formable into a water softener brine tank bag splitter 150 as shown in FIGS. 7-12.

The bag splitter 150 fits onto conventional water softener brine tanks 130 with a variety of shapes, sizes and width or diameters. The bag splitter 150 and its rod assembly 20 retract and extend as discussed above to fit the width or diameter of a specific brine tank 130. The bag splitter 150 retracts to a length of about eleven (11) inches to fit smaller brine tanks 130, extends to a length of about nineteen (19) inches to fit larger brine tanks, and is selectively fixable to any set length within this range. The flat bottom 131 of the brine tank 130 rests on the floor of the building, and generally defines the lateral width and perimeter or circumference 132 of the tank. An upwardly extending sidewall 133 with an upper end 134 extends around the tank perimeter. The sidewall 133 has opposed sides 133a and 133b, and inner and outer surfaces 133c and 133d. As noted above, conventional water softener brine tanks 130 come in a variety of sizes or capacities, and have a range of height between about three to five and a half (3 to 5.5) feet, and a range of widths or diameters between about eleven to eighteen (11 to 18) inches. The tank interior 135 holds salt 141 and water or brine 142 in its lower portion 135a. The upper portion 135b of the tank 130 contains a salty vapor and humid air 143.

A lid 136 with a downwardly extending rim 137 forms a seal 139 with the upper end 134 of the sidewall 133 to close the upper end. The tank 130 and lid 136 are commonly made of a flexible, corrosion resistant, non-moister absorbing plastic, such as high or low density polypropylene (HDPE or LDPE). The upper end 134 of the tank sidewall 133 and the downwardly extending rim 137 of the lid 136 are relatively thin, with a thickness of about one-sixteenth to one-eighth (1/16 to 1/8) inch. The thin upper end 134 of the sidewall 133 and rim 137 of the lid 136 are flexible, which allows them to form a snug fit seal 139 around the perimeter 132 of the upper end of the tank. The rim 137 of the lid 136 seals 139 against the tank sidewall 133 to close the upper end 134 and keep the salty vapor and humidity 143 inside the upper portion 135b of the tank 130 from propagating out of the tank and into the air inside a residential home or office building. While brine tanks 130 are designed to withstand hoop stress that holds the pellets of salt 141 and liquid water or brine 142 inside the tank, its thin sidewall 133 is not particularly suited for supporting a heavy object, such as a bag 145 of salt pellets 141, placed on top 134 of its sidewall 133 when the lid 136 is removed.

Salt bags 145 are commonly sold in twenty-five, forty, fifty and eighty pound sizes. Twenty-five (25) pound bags 145 are typically about twenty (20) inches long and twelve (12) inches wide. Forty (40) pound bags 145 are typically about twenty (20) inches long and fifteen (15) inches wide. Fifty (50) pound bags are typically about twenty-two (22) inches long and fifteen (15) inches wide. Eighty (80) pound bags 145 are typically about twenty-four (24) inches long and sixteen (16) inches wide. The bags 145 are made of a tough plastic material that is not readily torn open by hand. The bags 145 are typically cut open by a tool with a sharp blade, such as a box cutter or knife.

The brine tank bag splitter 150 includes the components of the universal bag splitter 10 and rod assembly 20, but is equipped with opposed, looped mounting brackets 160 that replace support brackets 26. Given brine tanks 130 come in a variety of widths ranging from eleven (11) to eighteen (18) inches, to achieve a telescoping bag splitter 150 with an eighty (80) pound load bearing capacity, the central rod 28 preferably has a length of about ten (10) inches and each end of the rod assembly 20 includes primary and secondary telescoping rods 42 and 44 with a length of about five (5) inches. This allows each telescoping rod 42 and 44 to be extended up to about four (4) inches while maintaining at least one inch of overlap between the rods (i.e., overlap between rods 28 and 42, and overlap between rods 42 and 44). The overlap between the rods 28, 42 and 44 allows the rod assembly 20 to support an eighty (80) pound load place on the middle of the assembly. When retracted to fit an eleven (11) inch diameter or wide brine tank 130, the rod assembly 20 has five (5) inches of overlap between rods 28 and 42, and five (5) inches of overlap between rods 42 and 44. When extended to fit an eighteen (18) inch diameter or wide brine tank 130, the rod assembly 20 has three (3) inches of overlap between rods 28 and 42, and three inches of overlap between rods 42 and 44. While the rod assembly 20 preferably includes primary and secondary rods 42 and 44 to achieve a full range of brine tank 130 diameters or widths while supporting an eighty pound load, it should be understood that the rod assembly can include only one telescoping rod at each end where the telescoping range reduced, such as to accommodate a more limited range of brine tank diameters or widths, such as a range of fourteen (14) to eighteen (18) inches.

Figure 9A:
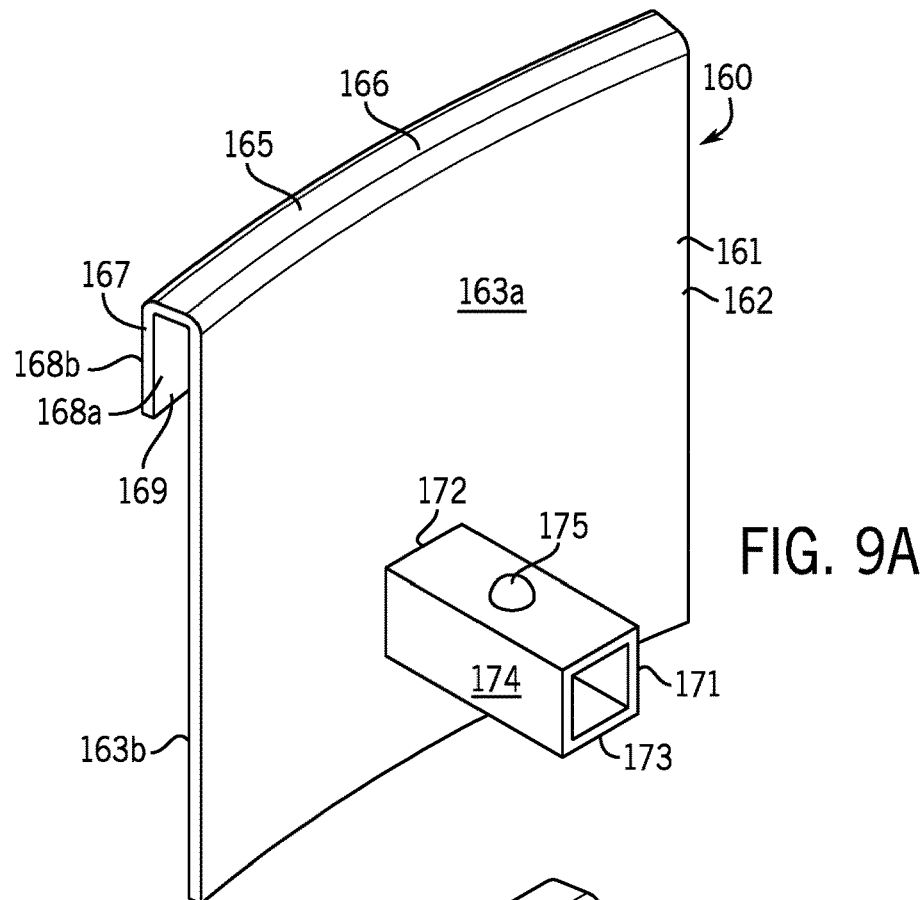
FIG. 9A is a perspective view of a curved embodiment of the vertical looped mounting bracket and inwardly extending receptor post.
Figure 9B:
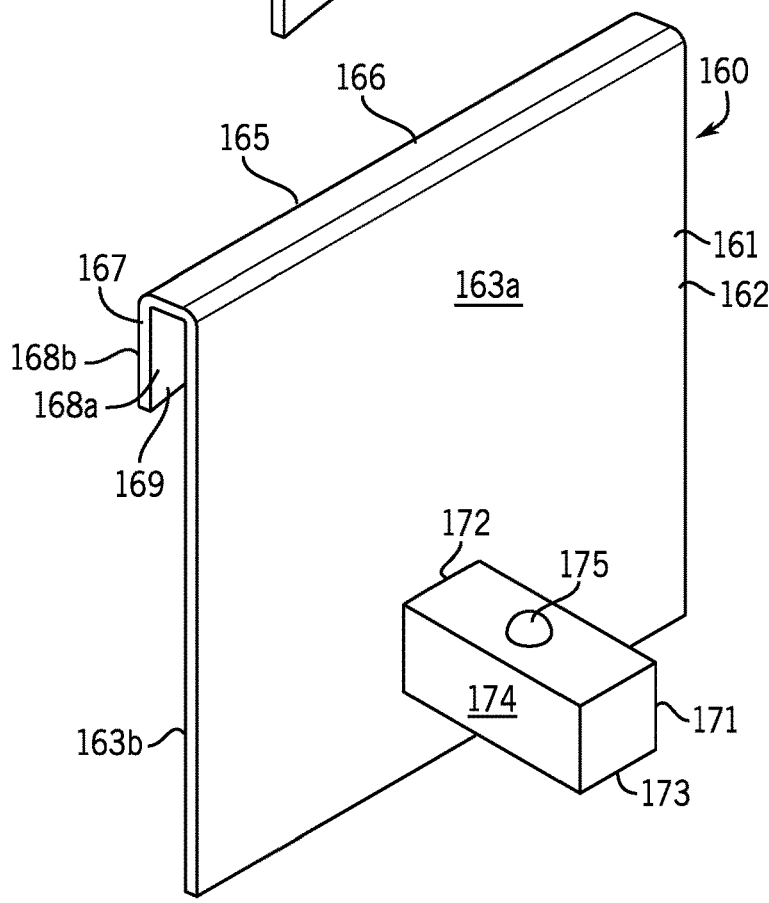
FIG. 9B is a perspective view of a straight embodiment of the vertical looped mounting bracket and inwardly extending receptor post.

The mounting brackets 160 are either slightly curved for a brine tank 130 with a round sidewall 133 as in FIG. 9A, or are straight for a brine tank with a square sidewall as in FIG. 9B. Each looped or slotted mounting bracket 160 is formed by a plate 161 with a downwardly extending main portion 162 having a thickness of about 1/16 inch, inner and outer surfaces 163a and 163b, and an upper looped end 165. The upper looped end 165 has a top 166 and a downwardly extending external portion 167 with inner and outer surfaces 168a and 168b. The brackets 160 are rigid to hold their shape, and are preferably made of a corrosive resistant metal for strength.

The bracket 160 has a length of about two to four (2 to 4) inches, and is preferably three (3) inches long. The main portion 162 has a top 166 to bottom vertical height of about three (3) inches. The vertical height of the main portion 162 is sufficient to keep the blade 24 entirely below the top 166 of the bracket 160, so that the blade is recessed from the upper end 134 of tank sidewall 133 and the tank lid 136 when the lid is secured to the tank. The looped end 165 has an outer width or thickness of about one-quarter to one half (1/4 to 1/2) inch, and forms a slot 169 with a uniform width of about one-sixteenth to five-eighths (1/16 to 5/8) inch. The depth of the slot 169 is about one (1) inch. The width of the brackets 160 combine with the narrow slot 169 and slot depth to help prevent the rod assembly 20 and blade 24 from rotating sideways when a bag of salt 145 strikes the blade.

Each bracket 160 has a tubular receptor 171 that extends horizontally and inwardly from its main vertical portion 162. The receptor 171 has a fixed end 172 and free end 173. The fixed end 172 is welded or otherwise rigidly secured to the inner surface 168a of the main vertical portion 162 of the bracket 160. The receptor 171 has a square shaped outside surface 174 that fits into and is snuggly received by the opening 79 at the rod end 78 of the rod assembly 20, similar to quick change connector 76. The surface 174 of the receptor 171 can have a detent 175 for snap fitting into the opening 79 at the end 78 of the rod assembly 20.

Figure 9C:
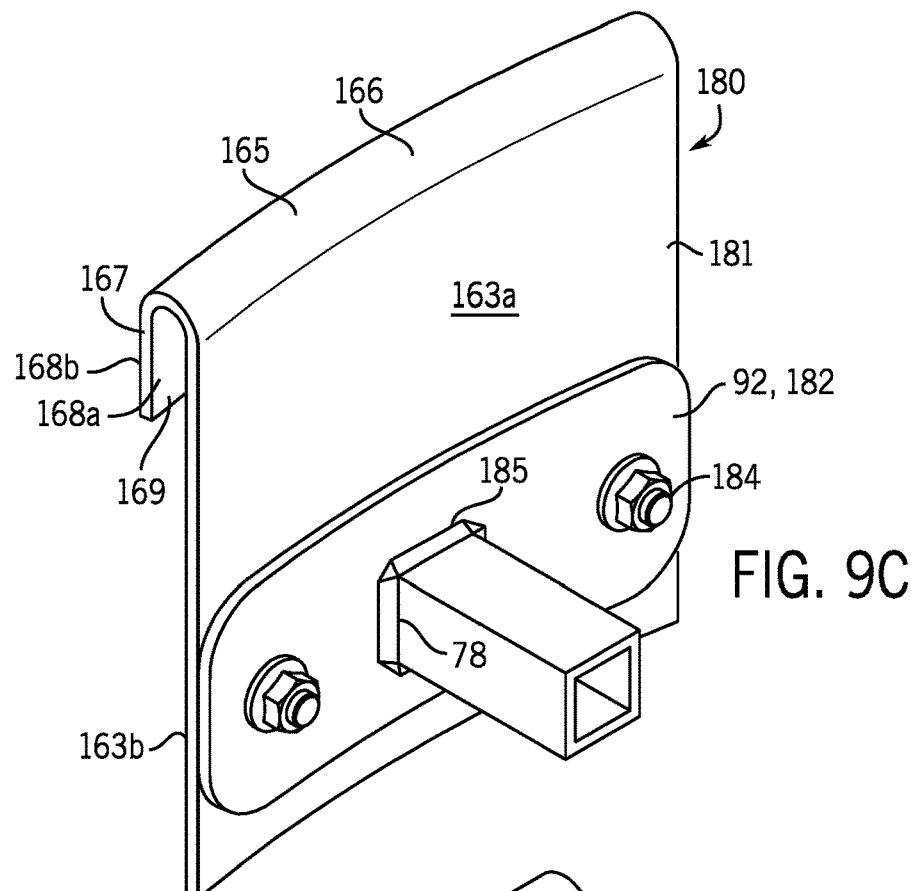
FIG. 9C is a perspective view showing the curved mounting bracket of FIG. 9A removably bolted to a mounting plate, with the mounting plate welded to an end of the rod assembly.
Figure 9D:
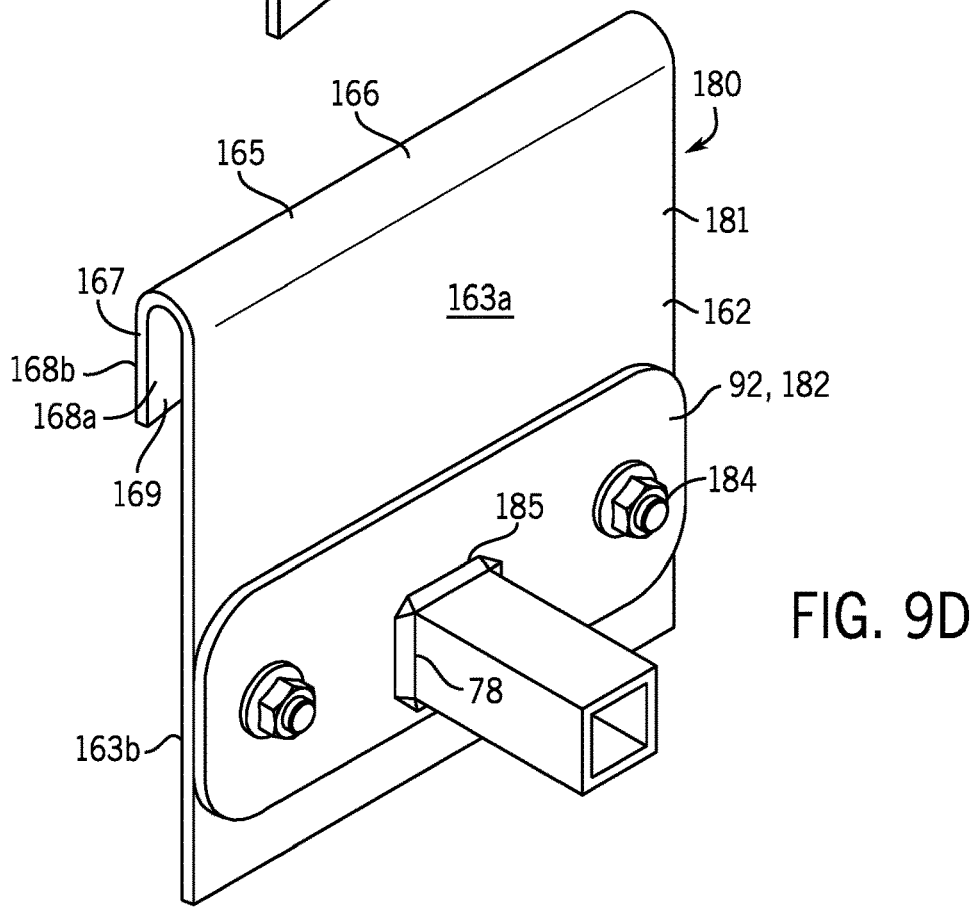
FIG. 9D is a perspective view showing the straight mounting bracket of FIG. 9B removably bolted to a mounting plate, with the mounting plate welded to an end of the rod assembly.

An alternate mounting bracket assembly 180 is shown in FIGS. 9C and 9D. This assembly 180 includes a mounting bracket 181 in conjunction with a mounting plate 182. The mounting bracket 181 is similar to mounting brackets 160 and its plate 161, but the receptor 171 is eliminated and two spaced holes are added. The mounting plate 182 is the same as or similar to mounting bracket 92. The spaced holes in mounting bracket 181 are aligned with the holes 102 in mounting plate 92, 182. Fasteners 184, such as headed bolts with cooperating nuts, pass through the holes in the brackets 181 and plates 182 to securely join them together. The mounting plate 92, 182 is welded 185 or otherwise rigidly secured to the rod end 78 of the rod assembly 20. This alternate bracket-plate assembly 180 allows the rod assembly 20 to be secured to the brine tank 130 in one of two ways. When the entire bracket-plate assembly 180 is used, the looped upper end 165 of the mounting brackets 181 are placed over and around the upper end 134 of the sidewall 133 as discussed above. Alternately, the mounting brackets 181 are removed, and the mounting plates 92, 182 are securely bolted 184 directly to the opposed sides 133a and 133b of the brine tank 130 as discussed above regarding container 12.

During use, the looped end 165 is positioned over and around the upper end 134 of the brine tank sidewall 133. The receptor 171 or plate 182 are located downward from the top 166 of the bracket 160 about two to two and a half (2 to 2½) inches, a sufficient distance so that the splitter blade 24 and its sheath 25 remain below the top 166 of the bracket 160. When installed over the opposed upper end 133a or 133b of the brine tank 130, the looped upper ends 165 of the brackets 160 engage and preferably snuggly grip the upper end 134 of the tank. When a straight bracket 160 (FIG. 9B) is secured to a brine tank 130 with a round upper end 134 (FIG. 7), the three inch wide bracket 160 slightly deforms the upper end 134 of the tank sidewall 133. This slight elastic deformation (not shown) of the sidewall 133 generates a gripping force to further help hold the bracket 160 in place on the sidewall 133 and prevent the blade 24 from rotating laterally or to its side during use. This slight deformation of the sidewall 133 is accommodated by the laterally flexible rim 137 of the lid 136, and is not believed to impact the seal 139 between the rim of the lid and the upper end 134 of the tank 130.

Figure 10:
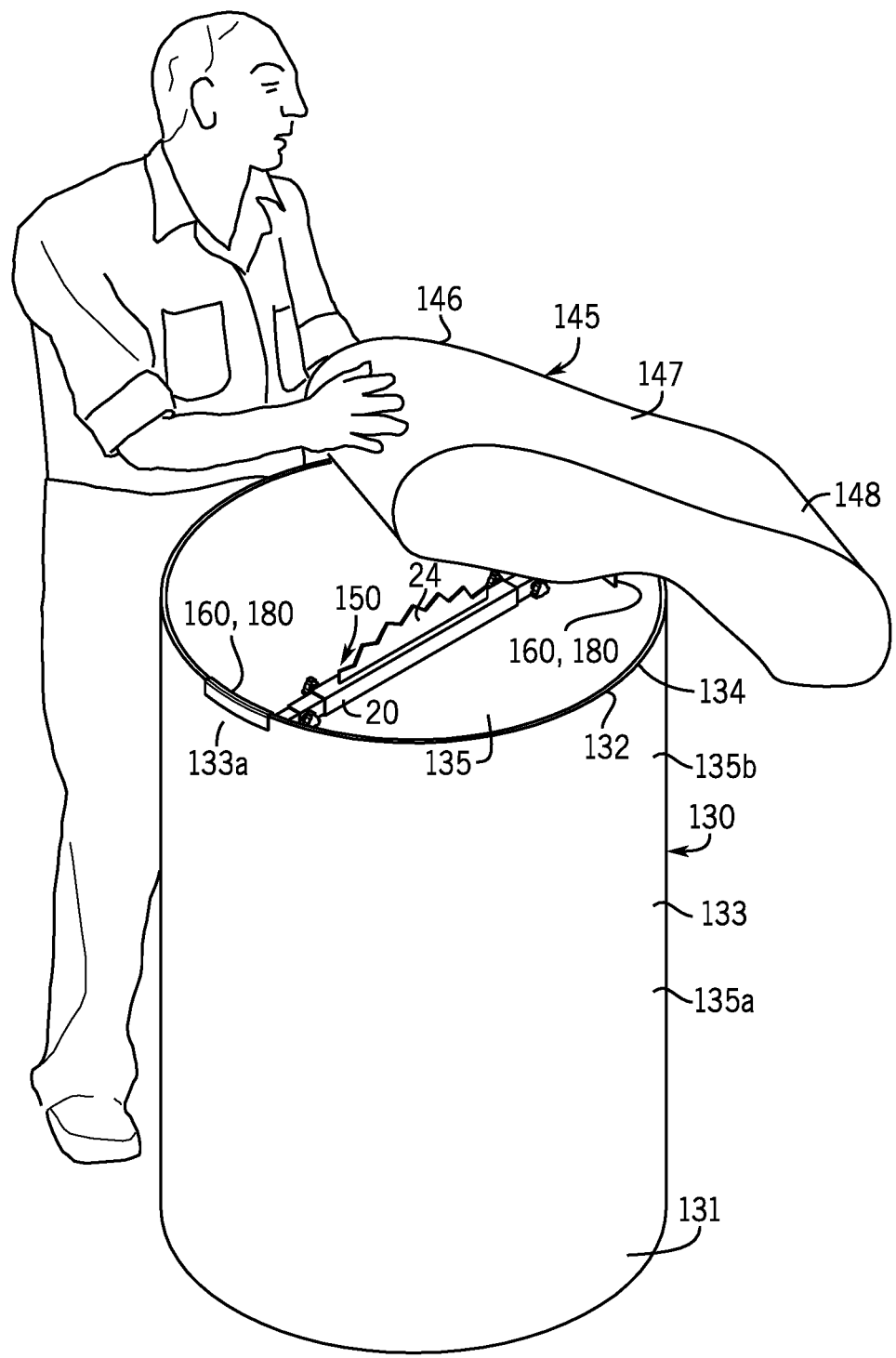
FIG. 10 is a perspective view showing a person that has lifted a bag of salt pellets up with the middle portion of the bag resting on the upper end of the brine tank sidewall and one of the bag splitter mounting brackets, the rearward bag portion hanging over the outside of the tank sidewall, and the forward bag portion in an upright position before it is lowered to engage the splitter blade.
Figure 11:
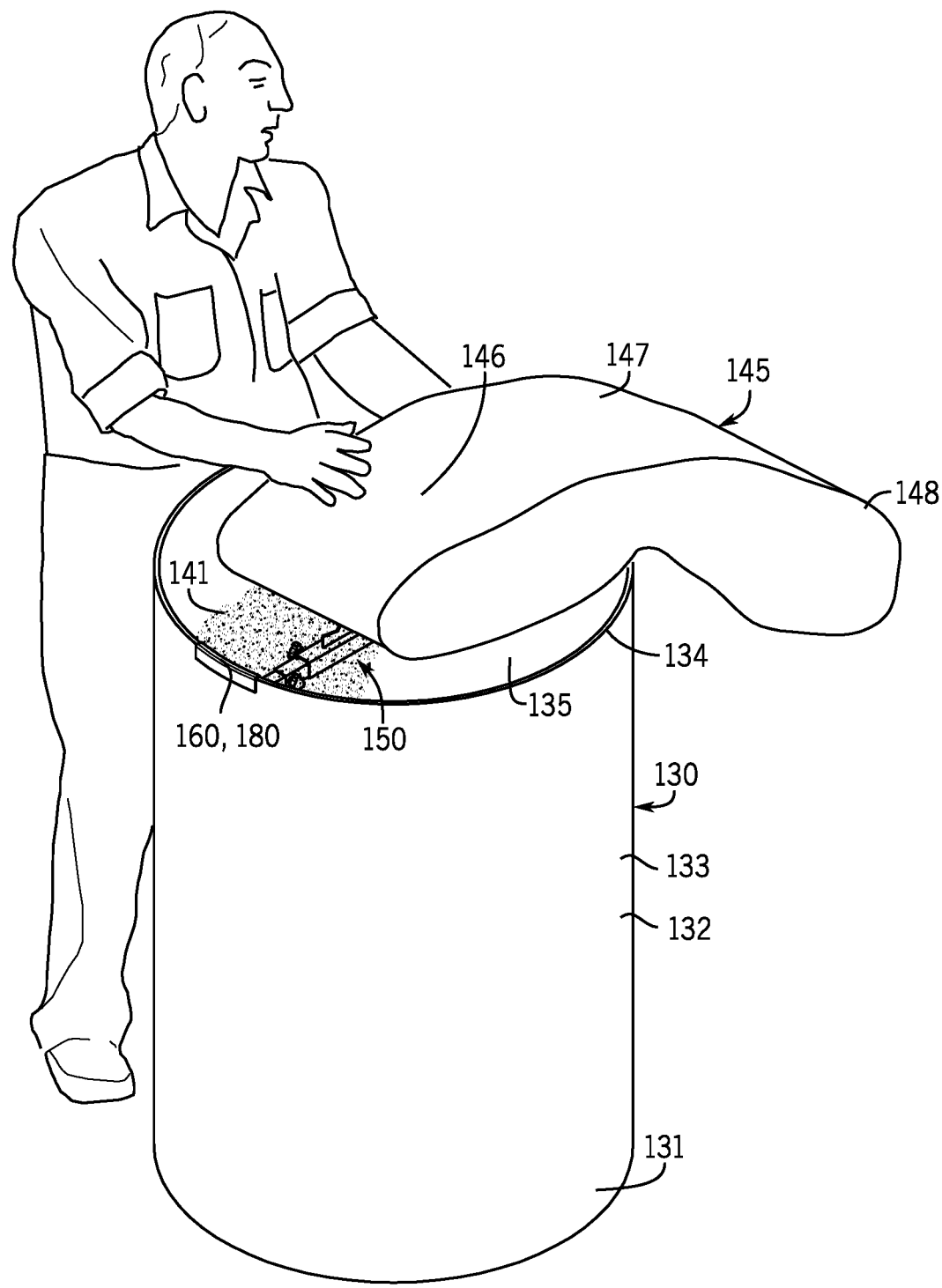
FIG. 11 is a perspective view showing a person that has lifted a bag of salt pellets up with the middle portion of the bag resting on the upper end of the brine tank sidewall, the rearward bag portion still hanging over the outside of the tank sidewall, and the forward bag portion lowered to engage the splitter blade so that pellets pour out and into the tank.
Figure 12:
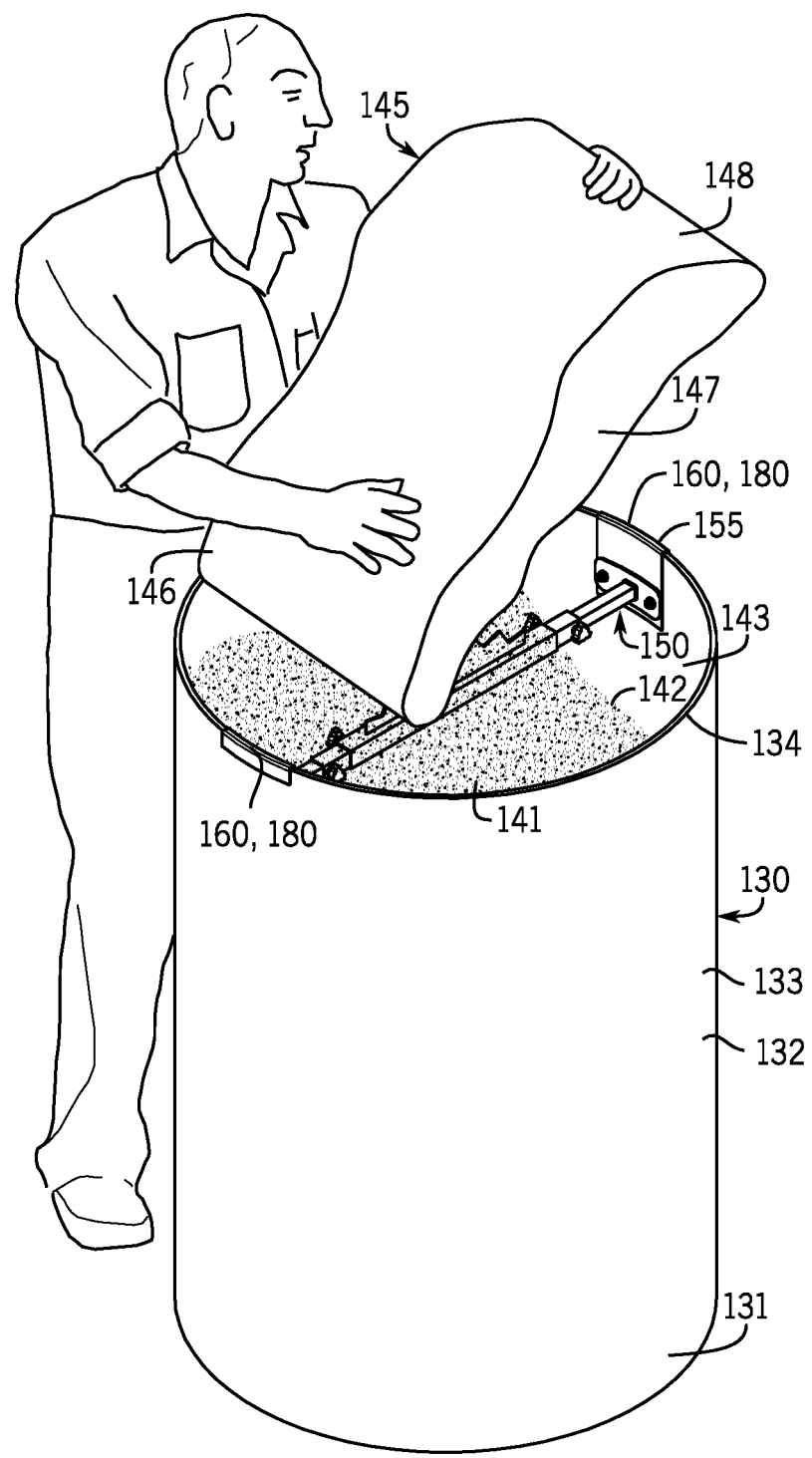
FIG. 12 is a perspective view showing the forward portion of the bag emptied of pellets, and the person lifting the rearward bag portion over the upper end of the tank sidewall so that the remaining pellets in the bag pour into the brine tank.

When installed on a water softener brine tank 130, the rod assembly 20 and brackets 160, 180 of the bag splitter 150 form a bridge or brace between opposed sides 133a and 133b of the tank sidewall 133 to stiffen or support its upper end 134. Once the telescoping rod assembly 20 is extended to a length equal the width or diameter of the brine tank 130, the knobs 48 are tightened to fix the length of the rod assembly 20. The fixed or rigid length of the rod assembly 20 and the shape of the rigid brackets 160, 180 stiffen the otherwise laterally flexible nature of the upper end 134 of the tank 130. The bag splitter 150 and stiffened upper end 134 of the sidewall 133 combine to form a platform or podium 155 to support the weight of a salt bag 145. Depending on the person lifting the salt bag 145, the platform 155 can be just the top 166 of the bracket 160, 180 or it can include the top 130 of the rod assembly 20. A person lifts the salt bag 145 up and places or rests its middle portion 147 on one side 133a or 133b of the upper end 134 of the brine tank 130 and top 166 of the bracket 160, 180 as shown in FIG. 10. The person does not have to lift the entire weight of the bag 145 over the upper end 134 of the tank 130. As the length of the bag 145 is larger than the width of the tank 130, the rearward portion 148 of the bag 145 hangs over the outside of the tank sidewall 133. The person then lays or drops the forward portion 146 of the bag 145 onto the top surface 30 of the support rod 28 and blade 24 as shown in FIG. 11. When placed on top of the bracket 160, 180, the weight of the bag 145 presses down on the bracket to lock it in place against the upper end 134 of the tank 130 so that the blade 24 will not rotate laterally or sideways when the bag is dropped onto and strikes the blade. When the weight of the forward bag portion 146 engages the seven (7) inch long blade 24, the forward bag portion 146 cuts a seven inch long opening into the bag 145, and the salt pellets 141 quickly pour or gush out and into the interior 135 of the tank 130. As the forward bag portion 146 empties, the bag 145 becomes lighter and its center of gravity shifts toward the rearward bag portion 148. The person then lifts the lighter rearward portion 148 up over the upper end 134 of the tank sidewall 133 to pour the remaining pellets through the cut opening in the bag 145 and down into the tank interior 135 as shown in FIG. 12. Although the rod assembly 20 is shown and described as being a telescoping rod assembly so that it can fit a variety of brine tank widths and diameters, it should be understood that the rod can have a fixed length without telescoping capabilities, such as by a single piece of material, without departing from the broad aspects of the invention.

After filling the brine tank 130 with salt pellets 141, the blade guard or sheath 25 is placed over the blade 24, and the lid 136 is secured to the upper end 134 of the brine tank sidewall 133 to close the tank interior 135 and prevent the humidity and salty vapor 143 inside the upper portion 135b of the tank from propagating into the room. The flexible rim 137 fits around both the upper end 134 of the tank sidewall 133 and the looped end 165 of each bracket 160 to form a 360 degree air seal 139 around the perimeter 132 of the tank.

The rod assembly 20 is extended or retracted to position the mounting brackets 160 on the brine tank sidewall 133 so that the lid rim 137 properly seals 139 against the upper end 134 of the tank sidewall 133. The rod assembly 20 is extended to shift the mounting brackets 160 outwardly or retracted to shift the brackets inwardly. The ability to shift the position of the brackets 160 is useful both when the slot 169 of the mounting bracket 160 snuggly receives the upper end 134 of the brine tank sidewall 133 and when the slot 169 is wider than the thickness of the sidewall 133. The mounting brackets 160 are shifted either inwardly or outwardly to accommodate the sealing 139 engagement of the lid rim 137. For brine tanks 130 with a lid rim 137 that snuggly engages the outside surface of the tank (FIG. 7), the mounting brackets 160 are shifted or otherwise positioned on the upper end 134 of the sidewall 133 so that their downwardly extending external portions 167 are flush against the outside surface 133d of the tank sidewall. The inner surface 168a of the external portion 167 is flush against the outer surface 133d of the tank sidewall 133. The outer surface 168b of the external portion 167 is flush against the inner surface of the lid rim 137. For a brine tank 130 with a lid rim 137 that snuggly engages the inside surface of the tank (FIG. 8), the mounting brackets 160 are shifted or otherwise positioned on the upper end 134 of the tank sidewall 133 so that their main vertical portions 162 are flush against the inside surface 133c of the tank sidewall 133. The outer surface 163b of the main portion 162 is flush against the inside surface 133c of the tank sidewall 133. The inside surface 163b of the main portion 162 is flush against the outer surface of the lid rim 137.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:

1. A water softener brine tank salt bag splitter for a residential or office building water softener brine tank having a thin laterally flexible sidewall extending around a tank perimeter to form a tank interior that holds salt pellets and water or brine in a lower interior portion and contains humid air and salty vapor in an upper interior portion, the sidewall extending upwardly and having an open upper end with opposed wall sides and a tank width or diameter, each of the opposed wall sides having an outside wall surface, the brine tank having a tank lid with a thin laterally flexible downwardly extending rim adapted to snuggly engage the outside wall surface of the upper end of the sidewall to form an air seal around the upper end of the tank perimeter to close the open upper end of the sidewall and prevent the escape of the humid air and salty vapor; the lid being removable to add salt pellets from a salt bag, the salt bag having a salt bag weight, said water softener brine tank, salt bag splitter comprising:
 a telescoping rod assembly with first and second rods, first and second opposed rod ends and first and second mounting brackets, each of said mounting bracket being connected to one of said opposed rod ends, said rod assembly and mounting brackets having an adjustable rod length, and said rod length being selectively fixable to a set rod length;
 a cutting blade attached to and extending upwardly from said rod assembly and positioned over the tank interior;
 each of said mounting brackets having a downwardly extending main internal portion and a looped upper end with a downwardly extending external portion, each of said looped upper ends being secured over and around one of the upper end of the opposed wall sides each of said external portions having inner and outer bracket surfaces, and each of said main internal portions being secured to one of said opposed rod ends of said rod assembly; and,
 wherein said rod assembly is fixed at said set rod length equal to the width or diameter of the upper end of the tank sidewall to join the opposed wall sides and laterally stiffen the upper end of the tank sidewall and support the salt bag weight when the tank lid is removed, and wherein said inner bracket surface of each of said external portions snuggly engages the outside wall surface of one of the opposed wall sides, and the downwardly extending rim of the lid snuggly engages the outside surface of the upper end of the sidewall and said outer bracket surface of said looped upper ends of said mounting brackets to form the air seal around the upper end of the tank perimeter and mounting brackets to prevent the escape of the humid air and salty vapor from the brine tank when the lid is secured.

2. The water softener brine tank salt bag splitter of claim 1, and wherein said rod assembly and mounting brackets combine with the upper end of the tank sidewall to form a platform to support the salt bag weight when the lid is removed.

3. The water softener brine tank salt bag splitter of claim 2, and wherein the salt bag rests on one of said mounting brackets to hold said bracket against the upper end of the brine tank sidewall to prevent said blade and said rod assembly from rotating sideways when the bag drops down onto said blade.

4. The water softener brine tank salt bag splitter of claim 1, and wherein said mounting brackets have a vertical height of about three inches and a width of about three inches and said looped upper end has a slot with a slot depth of about one inch to prevent said blade and said rod assembly from rotating sideways when the salt bag engages said blade.

5. The water softener brine tank salt bag splitter of claim 4, and wherein the upper end of the brine tank sidewall has a thickness of about $1/16$ to $1/8$ inch, and said slots of said mounting brackets have a slot width of about $1/8$ to $5/8$ inch.

6. The water softener brine tank salt bag splitter of claim 1, and wherein the air seal around the upper end of the tank perimeter is formed between the laterally flexible upper end of the tank sidewall, said mounting brackets and the laterally flexible rim of the tank lid.

7. The water softener brine tank salt bag splitter of claim 6, and wherein said inner bracket surfaces are flush with said tank sidewall, and the lid rim is flush with said outer bracket surfaces of said external portions of said looped upper ends.

8. The water softener brine tank salt bag splitter of claim 1, and wherein said upwardly extending blade remains entirely below said top of said looped upper end of said mounting brackets to space said blade from the lid when the lid is secured to the open upper end of the brine tank.

9. The water softener brine tank salt bag splitter of claim 8, and wherein said blade has a sheath to prevent said blade from cutting into the lid when the lid is secured to the open upper end of the brine tank.

10. The water softener brine tank salt bag splitter of claim 1, and wherein each of said rod ends has an open interior, and each of said mounting brackets includes an inwardly extending receptor shaped to fit into said open interior of one of said rod ends in a fixed, non-rotatable manner.

11. The water softener brine tank salt bag splitter of claim 10, and wherein each of said receptors has a detent for longitudinally locking its said bracket to one of said rod ends.

12. The water softener brine tank salt bag splitter of claim 1, and wherein each of said mounting brackets is a bracket-plate assembly, said bracket-plate assembly includes a mounting plate and said mounting bracket, said mounting plate is ridgedly secured one end of the rod assembly, and said mounting bracket is removably secured to the mounting plate.

13. The water softener brine tank salt bag splitter of claim 12, and wherein said mounting bracket and said mounting plate of said bracket-plate assembly have spaced apart holes aligned to receive bolts to removably join said mounting bracket and said mounting plate together.

14. The water softener brine tank salt bag splitter of claim 12, and wherein said mounting brackets and said mounting plates of said bracket-plate assembly has one of either a curved or straight configuration.

15. The water softener brine tank salt bag splitter of claim 1, and wherein said mounting brackets are rigid and have a straight configuration, the sidewall of the brine tank has a circular configuration, each of said rigid mounting brackets elastically deforms said flexible sidewall to generate a deformation force that holds said mounting bracket against the upper end of the brine tank to prevent said blade and rod assembly from rotating sideways when the salt bag engages said blade.

16. A water softener brine tank salt bag splitter for a residential or office building water softener brine tank having a thin laterally flexible sidewall extending around a tank perimeter to form a tank interior that holds salt pellets and water or brine in a lower interior portion and contains humid air and salty vapor in an upper interior portion, the sidewall extending upwardly and having an open upper end with opposed wall sides and a tank width or diameter, each of the opposed wall sides having an outside wall surface, the brine tank having a tank lid with a thin laterally flexible downwardly extending rim adapted to snuggly engage the outside wall surface of the upper end of the sidewall to form an air seal around the upper end of the tank perimeter to close the open upper end of the sidewall and prevent the escape of the humid air and salty vapor; the lid being removable to add salt pellets from a salt bag, the salt bag having a salt bag weight, said water softener brine tank salt bag splitter comprising:
- a rod assembly having first and second opposed rod ends and first and second mounting brackets, each of said mounting bracket being connected to one of said opposed rod ends, said rod assembly and mounting brackets having a set rod length;
- a cutting blade attached to and extending upwardly from said rod assembly and positioned over the tank interior;
- each of said mounting brackets having a downwardly extending main internal portion and a looped upper end with a downwardly extending external portion, each of said looped upper ends being secured over and around the upper end of one of the opposed wall sides, each of said external portions having inner and outer bracket surfaces, and each of said main internal portions being adapted for securement to said rod assembly; and,
- wherein said set rod length is equal to the width or diameter of the upper end of the tank sidewall to join the opposed wall sides and laterally stiffen the upper end of the tank sidewall and support the salt bag weight when the tank lid is removed, and wherein said inner bracket surface of each of said external portions snuggly engages the outside wall surface of one of the opposed wall sides, and the downwardly extending rim of the lid snuggly engages the outside surface of the upper end of the sidewall and said outer bracket surface of said looped upper ends of said mounting brackets to form the air seal around the upper end of the tank perimeter and mounting brackets to prevent the escape of the humid air and salty vapor from the brine tank when the lid is secured.

17. A water softener brine tank salt bag splitter used in combination with a residential or office building water softener brine tank containing salt pellets, water or brine and humid air, the salt pellets being from a salt bag having a salt bag weight, said water softener brine tank salt bag splitter used in combination with a water softener brine tank comprising:
- a) a brine tank having a thin laterally flexible sidewall extending around a tank perimeter to form a tank interior that holds the salt pellets and water or brine in a lower interior portion and contains the humid air in an upper interior portion, said sidewall extending upwardly and having an open upper end with opposed wall sides and a tank width or diameter, each of the opposed wall sides having an outside wall surface, said brine tank having a tank lid with a thin laterally flexible downwardly extending rim adapted to snuggly engage said outside wall surface of said upper end of said sidewall to form an air seal around said upper end of said tank perimeter to close said open upper end of said sidewall and prevent the escape of the humid air, said lid being removable to add the salt pellets from the salt bag;
- b) a salt bag splitter having a telescoping rod assembly with first and second rods, first and second opposed rod ends and first and second mounting brackets, each of said mounting bracket being connected to one of said opposed rod ends, said rod assembly and mounting brackets having an adjustable rod length, and said rod length being selectively fixable to a set rod length, said salt bag splitter having a cutting blade attached to and extending upwardly from said rod assembly and positioned over said tank interior, each of said mounting brackets having a downwardly extending main internal portion and a looped upper end with a downwardly extending external portion, each of said looped upper ends being secured over and around said upper end of said opposed wall sides, each of said looped upper ends having a downwardly extending external portions having inner and outer surfaces, and each of said main internal portions being secured to one of said opposed rod ends of said rod assembly; and,
- wherein said rod assembly is fixed at said set rod length equal to said width or diameter of said upper end of said tank sidewall to join said opposed wall sides and laterally stiffen said upper end of said tank sidewall and support the salt bag weight when said tank lid is removed, and wherein said inner bracket surface of each of said external portions snuggly engages said outside wall surface of one of said opposed wall sides, and said downwardly extending rim of said lid snuggly engages said outside surface of said upper end of said sidewall and said outer surface of said looped upper ends of said mounting brackets to form said air seal around said upper end of said tank perimeter and mounting brackets to prevent the escape of the humid air from the brine tank when said lid is secured.

* * * * *